US012616299B1

(12) United States Patent
Eng et al.

(10) Patent No.: US 12,616,299 B1
(45) Date of Patent: May 5, 2026

(54) PLATFORM ASSEMBLY

(71) Applicant: ILW LC, Sheridan, WY (US)

(72) Inventors: Christopher Eng, Newton, MA (US); Patrick Triato, Portland, OR (US)

(73) Assignee: ILWLC, Sheridan, WY (US)

( * ) Notice: Subject to any disclaimer, the term of this patent is extended or adjusted under 35 U.S.C. 154(b) by 0 days.

(21) Appl. No.: 19/284,477

(22) Filed: Jul. 29, 2025

Related U.S. Application Data

(63) Continuation of application No. 19/280,677, filed on Jul. 25, 2025.

(Continued)

(51) Int. Cl.
*A47B 23/00* (2006.01)
*A47B 23/02* (2006.01)
(Continued)

(52) U.S. Cl.
CPC ............ *A47B 23/025* (2013.01); *A47B 23/04* (2013.01); *F16M 11/2092* (2013.01);
(Continued)

(58) Field of Classification Search
CPC ....... A47B 23/025; A47B 23/04; A47B 23/02; A47B 23/00; A47B 2200/0085;
(Continued)

(56) References Cited

U.S. PATENT DOCUMENTS 355,911 A * 1/1887 Bartow
763,281 A * 6/1904 Hales
(Continued)

FOREIGN PATENT DOCUMENTS

CN 110811144 A * 2/2020 ............. A47B 23/06
CN 119059077 A 12/2024
(Continued)

OTHER PUBLICATIONS

Final Office Action for U.S. Appl. No. 18/213,110, mailed Nov. 1, 2023, 7 pages.
(Continued)

*Primary Examiner* — Janet M Wilkens
(74) *Attorney, Agent, or Firm* — Elliott, Ostrander & Preston, P.C.

(57) ABSTRACT

A platform assembly with platform extending in a horizontal plane with a bottom surface, a vertical support member coupled to the platform and a C-clamp. The C-clamp comprises a horizontally oriented side coupled to the vertical support member; a first and second vertically oriented side extending downward; the second vertically oriented side comprising a threaded hole. A screw comprises a handle at a first end of the screw, and a shoe at a second end of the screw. A second end of the screw passes through the threaded hole and extends horizontally toward the first vertically oriented side of the C-clamp. Movement of the handle causes the second end of the screw to further extend horizontally toward the first vertically oriented side of the C-clamp such that the shoe and the first vertically oriented side of the C-clamp engage a support structure.

19 Claims, 25 Drawing Sheets

Related U.S. Application Data

(60) Provisional application No. 63/838,491, filed on Jul. 3, 2025.

(51) Int. Cl.

| | |
|---|---|
| *A47B 23/04* | (2006.01) |
| *F16M 11/20* | (2006.01) |
| *F16M 11/22* | (2006.01) |
| *F16M 13/02* | (2006.01) |

(52) U.S. Cl.
CPC .......... *F16M 11/22* (2013.01); *F16M 13/022* (2013.01); *A47B 2200/0085* (2013.01)

(58) Field of Classification Search
CPC ..... A47B 2200/0094; A47B 5/00; A47B 5/04; A47B 5/06; F16M 11/2092; F16M 11/22; F16M 13/022
USPC ......... 108/97, 98, 49, 46, 47, 152, 141, 135; 248/229.15, 229.25, 228.6, 230.6, 231.71, 248/447.2, 229.22
See application file for complete search history.

(56) References Cited

U.S. PATENT DOCUMENTS

| | | | | |
|---|---|---|---|---|
| 834,849 | A | | 10/1906 | Rollman |
| 1,232,757 | A | * | 7/1917 | Berkey .................... A47B 9/16 |
| | | | | 297/170 |
| 1,588,914 | A | * | 6/1926 | Smith .................... A47B 23/02 |
| | | | | 108/142 |
| 1,721,327 | A | * | 7/1929 | Anderson .............. A47B 23/02 |
| | | | | 108/152 |
| 2,551,157 | A | * | 5/1951 | Price ......................... G09F 7/18 |
| | | | | 248/231.71 |
| 2,655,337 | A | * | 10/1953 | Diesfeld ................. F21V 21/26 |
| | | | | 362/396 |
| 2,872,146 | A | * | 2/1959 | Kukla ....................... F16B 5/06 |
| | | | | 248/229.15 |
| 3,408,032 | A | * | 10/1968 | Francis ................ A47B 23/007 |
| | | | | 248/447.1 |
| 3,514,066 | A | * | 5/1970 | Henley .................. A47B 23/02 |
| | | | | 248/463 |
| 3,744,645 | A | | 7/1973 | Hochman |
| 4,575,149 | A | | 3/1986 | Forestal et al. |
| 4,698,936 | A | | 10/1987 | Helfman |
| 4,709,891 | A | * | 12/1987 | Barnett ..................... G09F 7/18 |
| | | | | 248/231.71 |
| 5,707,036 | A | * | 1/1998 | Dunbar .................. A47B 23/02 |
| | | | | 248/447.2 |
| 5,709,365 | A | * | 1/1998 | Howard .............. A47B 23/025 |
| | | | | 248/447.2 |
| 5,984,249 | A | | 11/1999 | Cohen |
| 6,012,690 | A | | 1/2000 | Cohen |
| 6,237,799 | B1 | | 5/2001 | Emerson |
| 11,311,103 | B1 | | 4/2022 | Wilson et al. |
| 11,986,087 | B1 | | 5/2024 | Eng et al. |
| 12,344,433 | B2 | | 7/2025 | Eng et al. |
| 2006/0220501 | A1 | | 10/2006 | Robertson |
| 2007/0101908 | A1 | | 5/2007 | Makita |
| 2009/0020047 | A1 | | 1/2009 | Noble et al. |
| 2022/0133032 | A1 | * | 5/2022 | Smith .................. A47B 23/025 |
| | | | | 248/445 |
| 2025/0100751 | A1 | | 3/2025 | Eng et al. |

FOREIGN PATENT DOCUMENTS

| | | | | | |
|---|---|---|---|---|---|
| DE | 518237 | C | * | 2/1931 | |
| DE | 202024102871 | U1 | | 9/2024 | |
| FR | 927318 | A | * | 10/1947 | |
| FR | 2963080 | A1 | * | 1/2012 | ........... F16M 13/022 |
| GB | 431476 | A | * | 7/1935 | ............. A47B 23/02 |
| JP | 4330675 | B2 | * | 9/2009 | |

OTHER PUBLICATIONS

Final Office Action for U.S. Appl. No. 18/653,856, mailed Dec. 20, 2024, 10 pages.
Non-Final Office Action for U.S. Appl. No. 18/213,110, mailed Sep. 21, 2023, 9 pages.
Non-Final Office Action for U.S. Appl. No. 18/653,856, mailed Sep. 10, 2024, 10 pages.
Notice of Allowance for U.S. Appl. No. 18/213,110, mailed Jan. 9, 2024, 7 pages.
Notice of Allowance for U.S. Appl. No. 18/653,856, mailed Mar. 12, 2025, 6 pages.
Restriction Requirement for U.S. Appl. No. 18/213,100, mailed Aug. 23, 2023, 5 pages.
Restriction Requirement for U.S. Appl. No. 18/653,856, mailed Jul. 3, 2024, 5 pages.

* cited by examiner

FIG. 1A
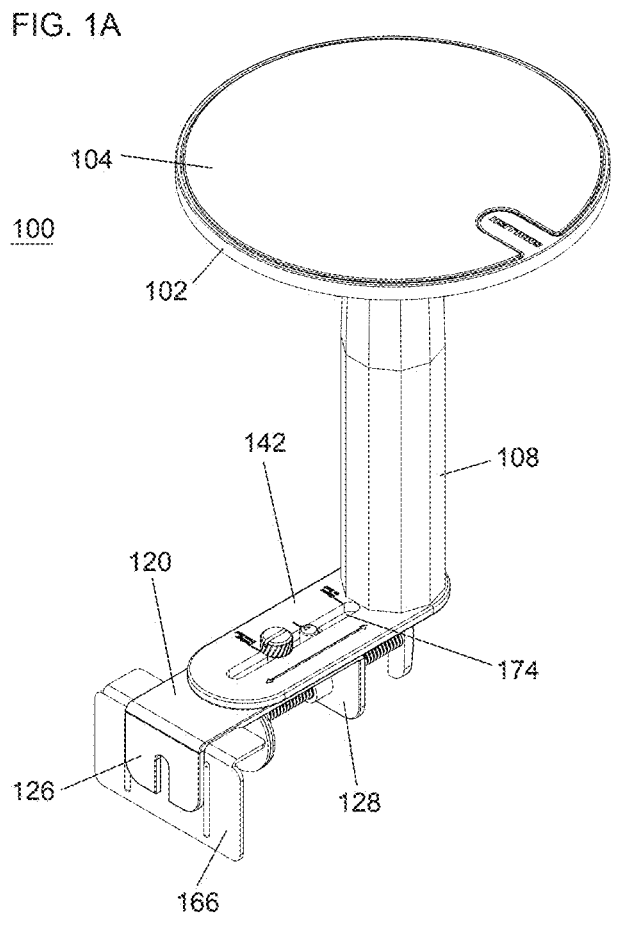
FIG. 1B
FIG. 1C
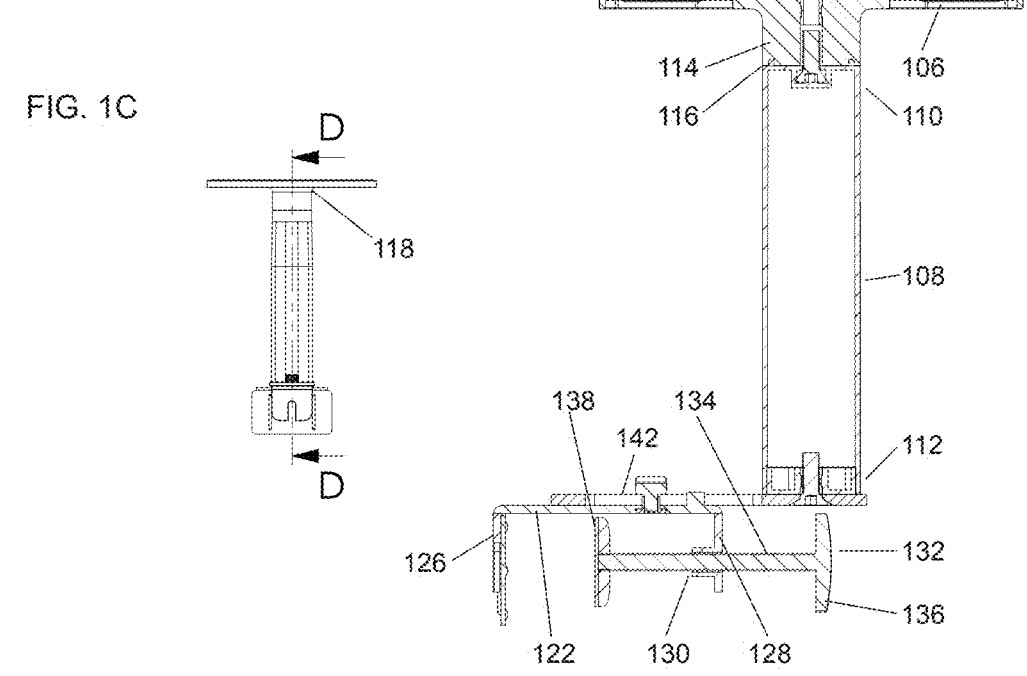

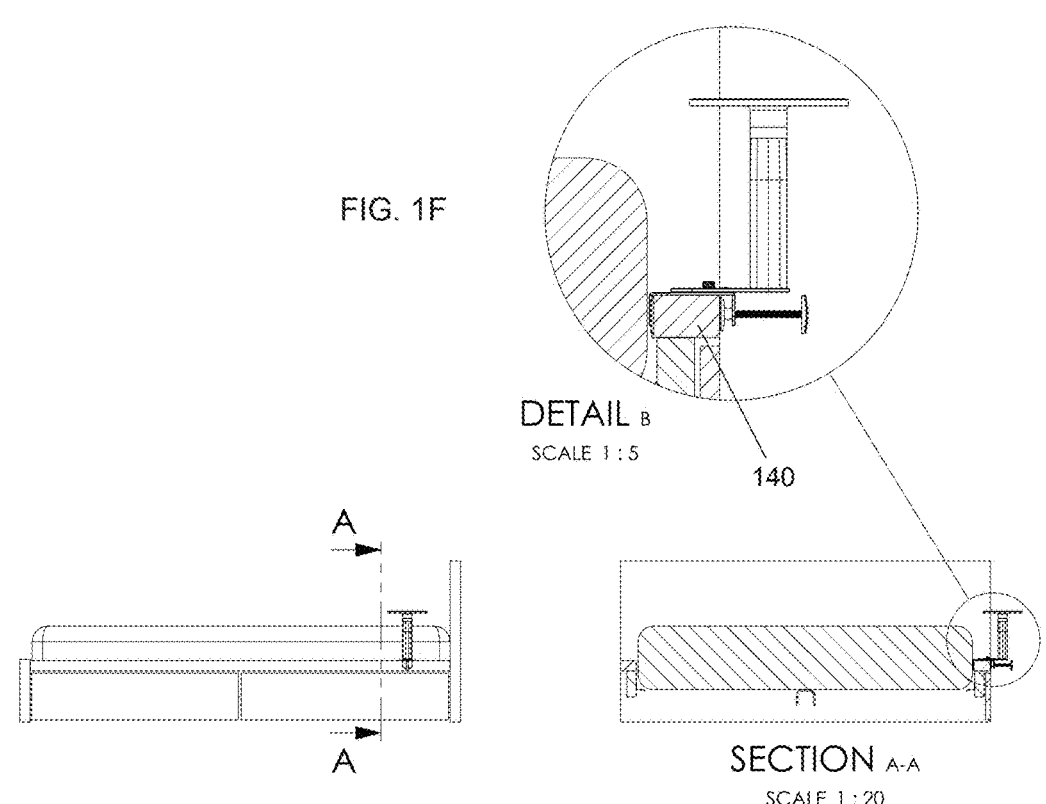
FIG. 1F
DETAIL B
SCALE 1 : 5
140
A
A
SECTION A-A
SCALE 1 : 20
FIG. 1G
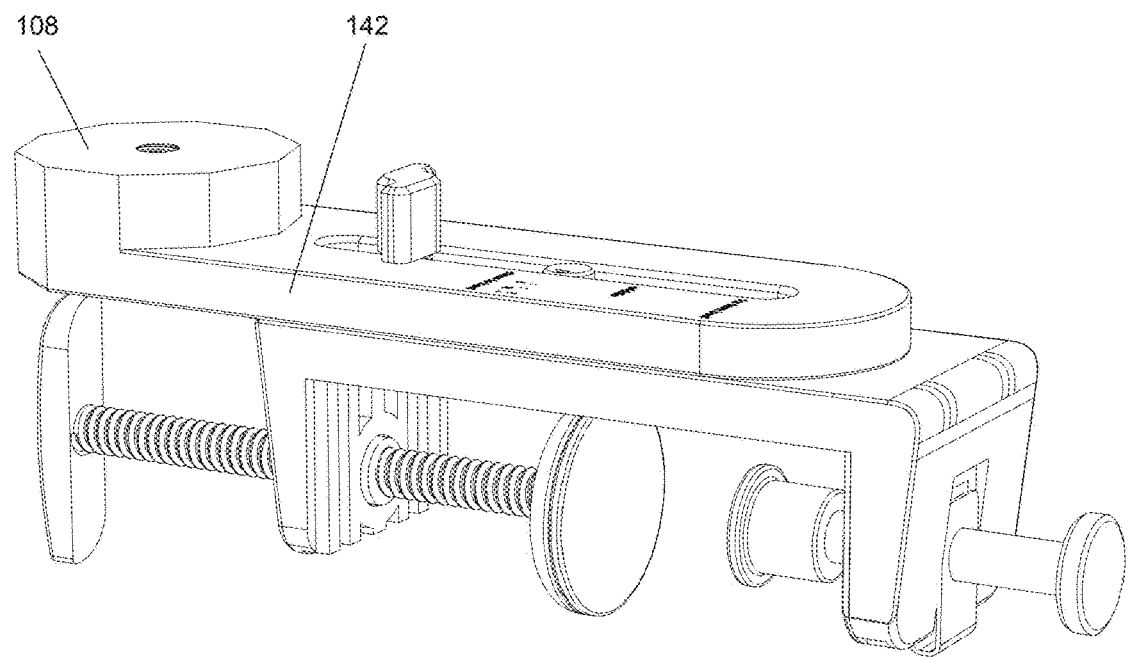
108
142

108

142

178

142

120

179

126

150 148 144

152

DETAIL B

SCALE 1 : 5

FIG. 7A
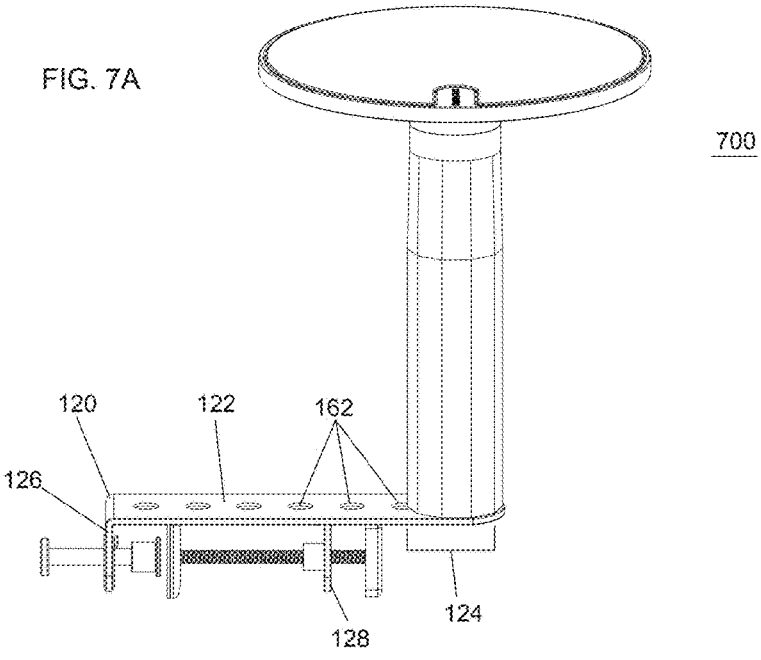
700
120    122    162
126
128    124
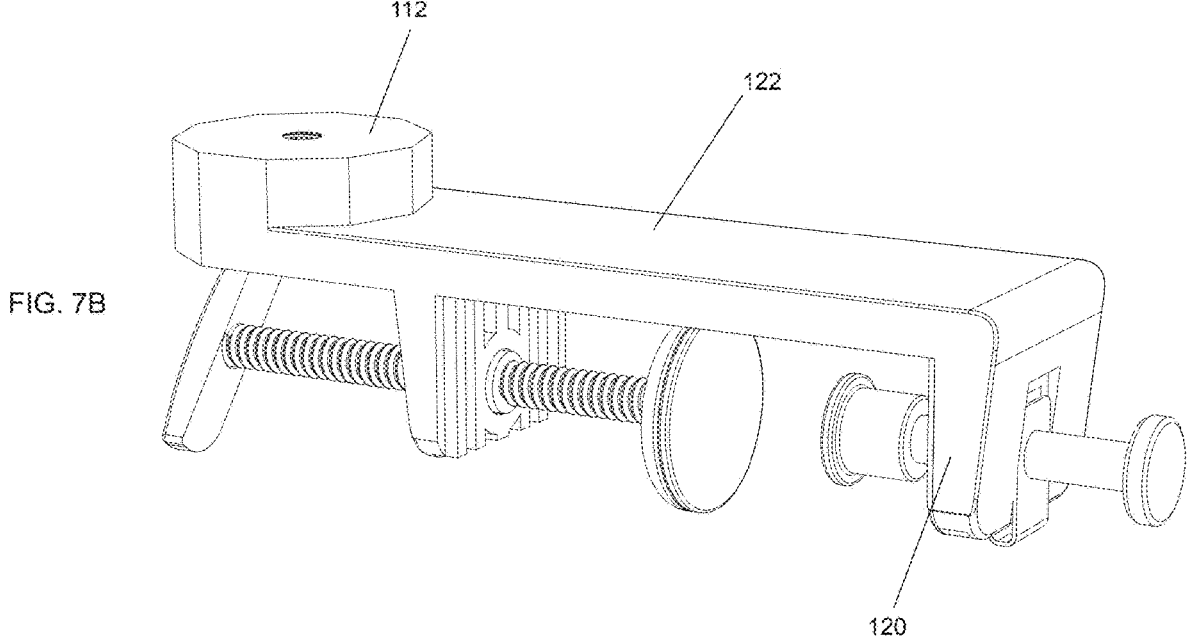
112
122
FIG. 7B
120

800

FIG. 9C
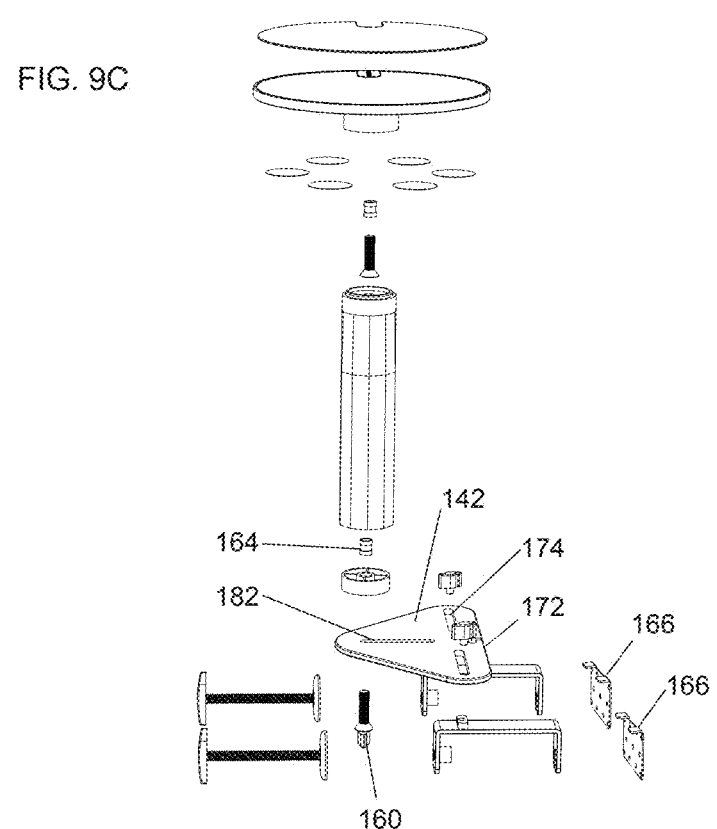
164
142
174
182
172
166
166
160
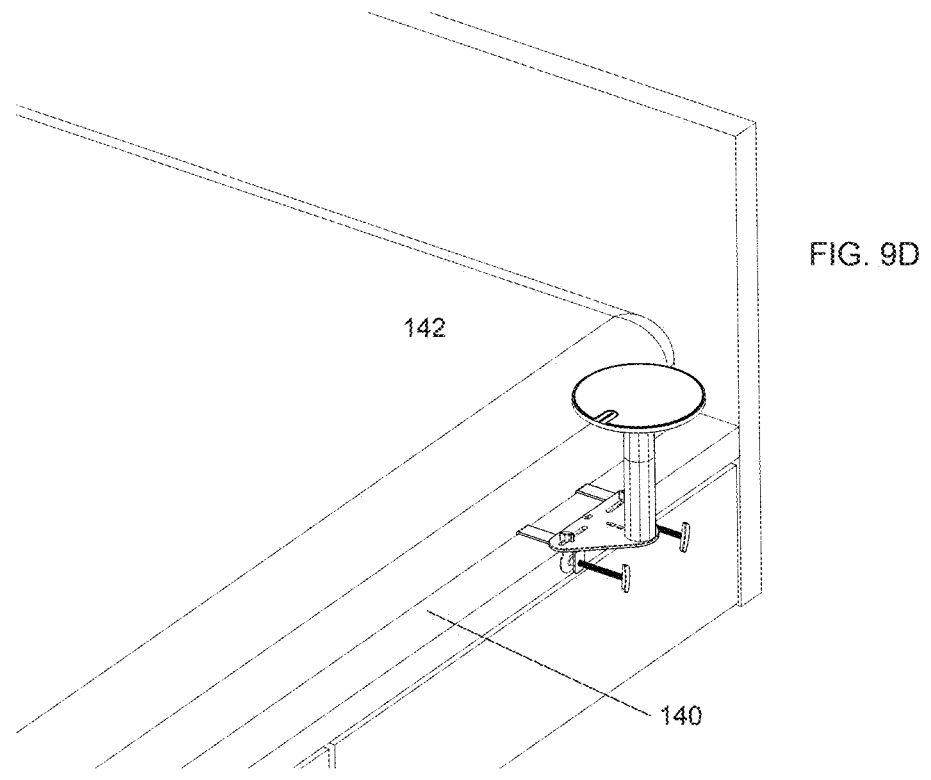
FIG. 9D
142
140

174    182

166

166

142

166

166

142

104

220

106

108

220

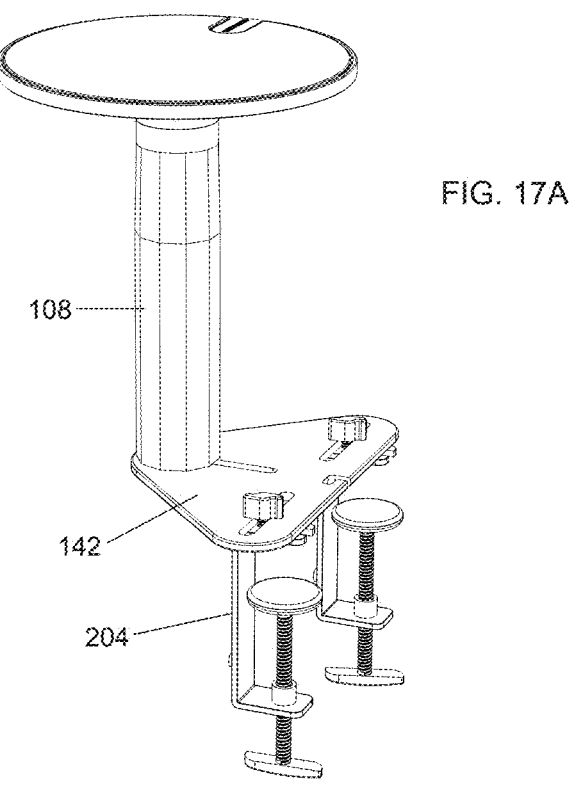
FIG. 17A
FIG. 17B
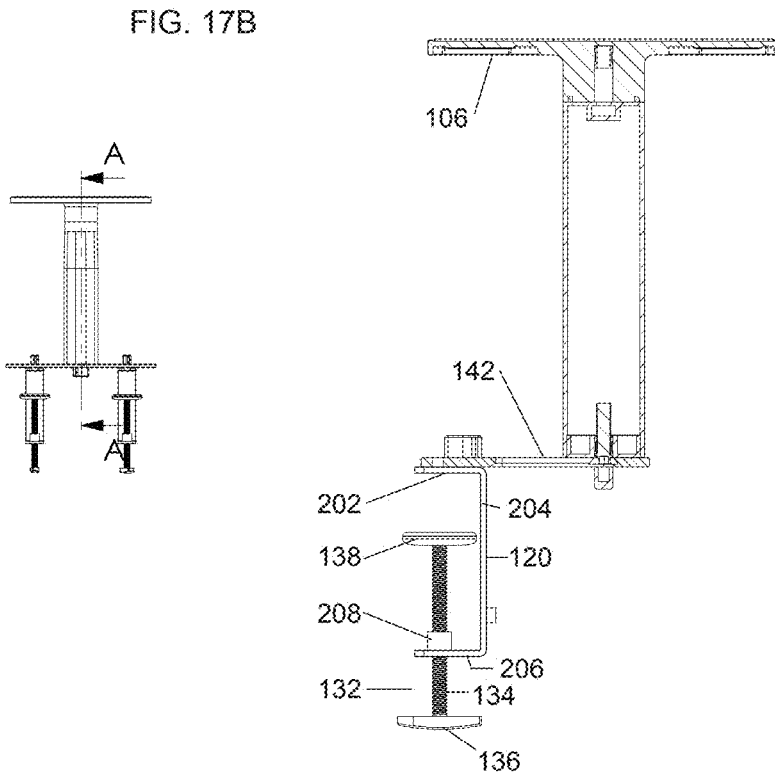

PLATFORM ASSEMBLY

CLAIM OF PRIORITY

This application is a continuation of U.S. patent application Ser. No. 19/280,677 filed Jul. 25, 2025, entitled, "PLATFORM ASSEMBLY," which claims the benefit of U.S. Provisional Patent Application No. 63/838,491, filed Jul. 3, 2025, entitled "PLATFORM ASSEMBLY," the disclosure of which is incorporated by reference herein in its entirety. This application is related to U.S. Non-Provisional application Ser. No. 18/213,110, issued on May 21, 2024 as U.S. Pat. No. 11,986,087, entitled "UTILITY TRAY"; U.S. Non-Provisional application Ser. No. 18/653,856, issued on Jul. 1, 2025 as U.S. Pat. No. 12,344,433, entitled "UTILITY TRAY"; and U.S. Non-Provisional application Ser. No. 18/974,579, filed Dec. 9, 2024, entitled "UTILITY TRAY," the disclosures of which are incorporated by reference herein in their entireties.

TECHNICAL FIELD

Embodiments of the present invention relate to a platform, and in particular a platform that can be attached to an upright support member, which can in turn be attached to another support member.

BACKGROUND

Platforms, such as utility trays, have previously been provided with attachment means for attaching the platform to a supporting structure. However, the attachment means does not work well for some platforms, or for some support structures, for example, a bed frame.

BRIEF DESCRIPTION OF THE DRAWINGS

The detailed description is set forth with reference to the accompanying figures. In the figures, the left-most digit(s) of a reference number identify the figure in which the reference number first appears. The use of the same reference numbers in different figures indicates similar or identical items or features.

FIGS. 1A-1F illustrate a platform assembly according to an embodiment of the invention.

FIGS. 1G, 1H, 1I and 1J illustrate a platform assembly in which a horizontally oriented plate may be molded or 3D-printed with a vertical support member as a single component, according to an embodiment of the invention.

FIG. 7A illustrates a platform assembly according to an embodiment of the invention.

FIGS. 7B and 7C illustrate a platform assembly in which a portion of a horizontally oriented side of a C-clamp is molded or 3D-printed with the vertical support member as a single component of the platform assembly.

FIGS. 9A-9D illustrate a platform assembly according to an embodiment of the invention.

FIGS. 17A-17C illustrate a platform assembly according to an embodiment of the invention.

DETAILED DESCRIPTION

Figure 1D:
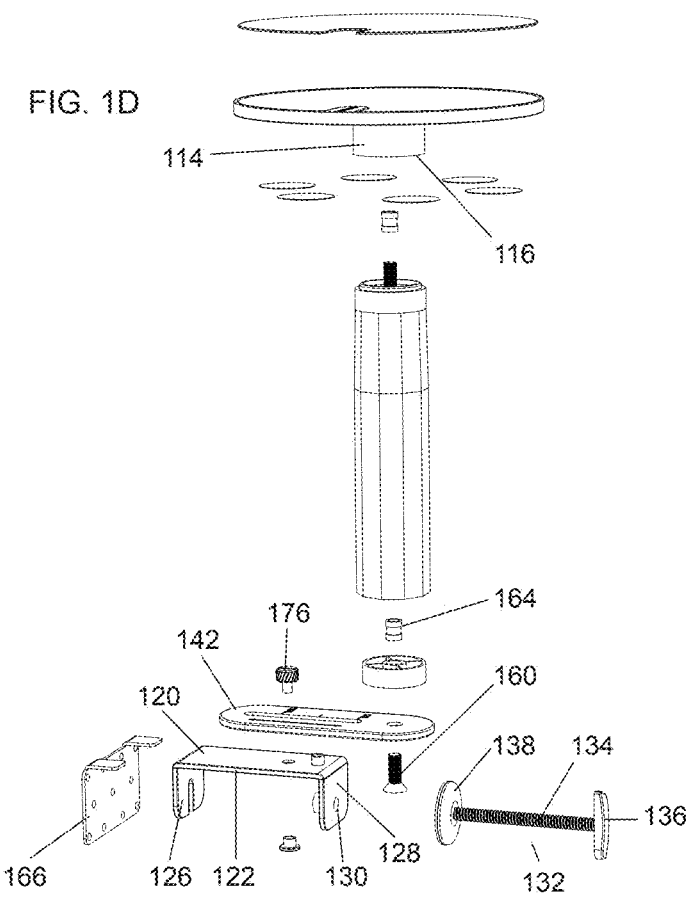
Figure 1E:
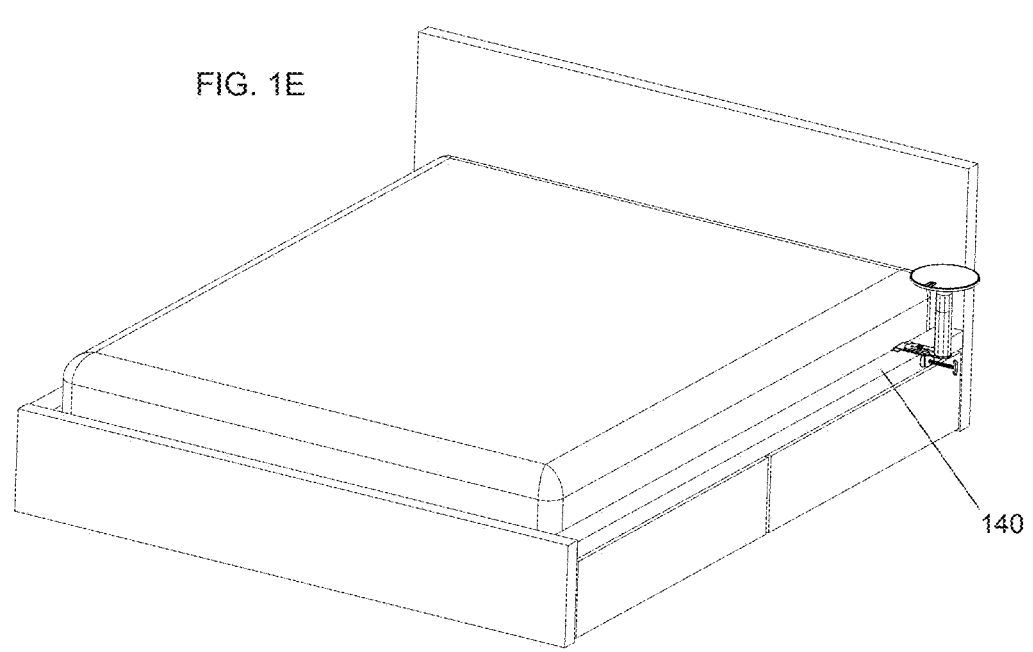
Figure 1H:
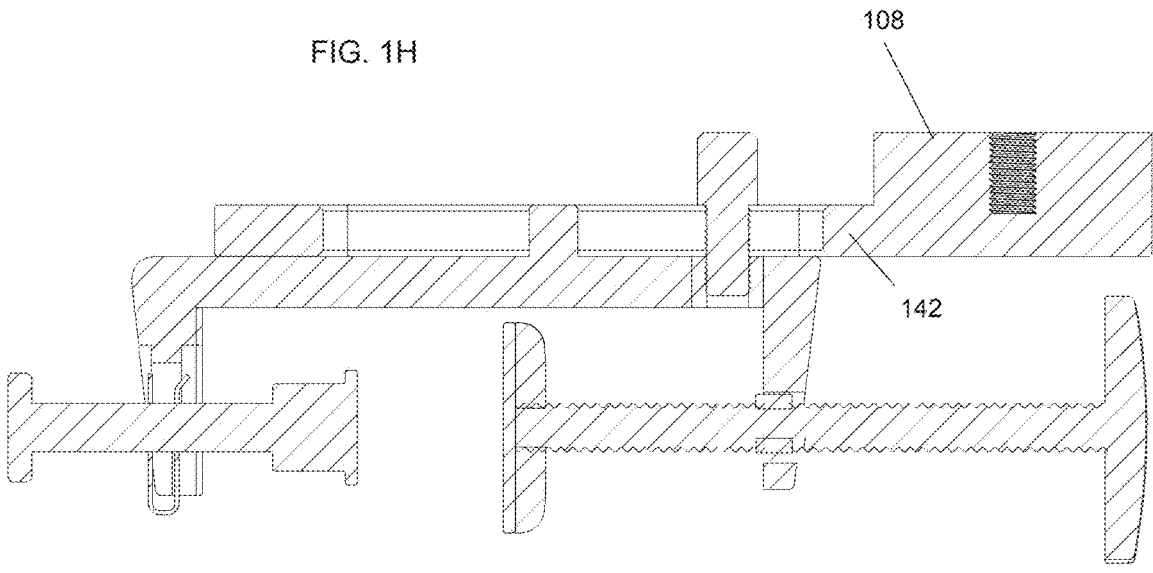
Figure 1I:
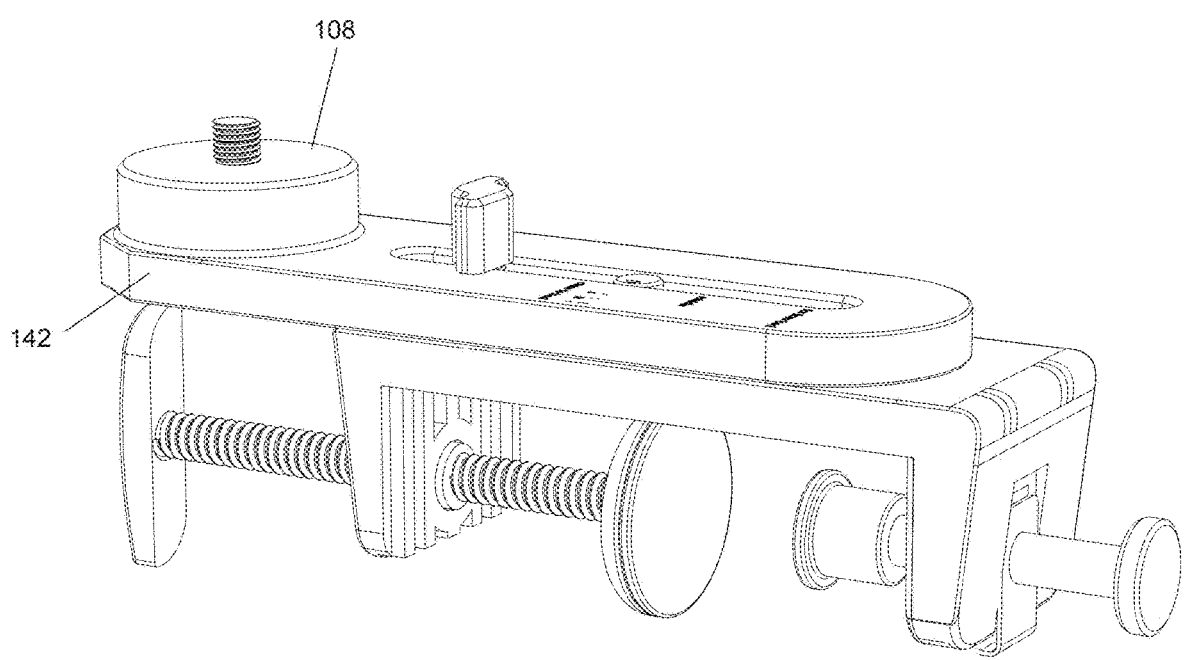
Figure 1J:
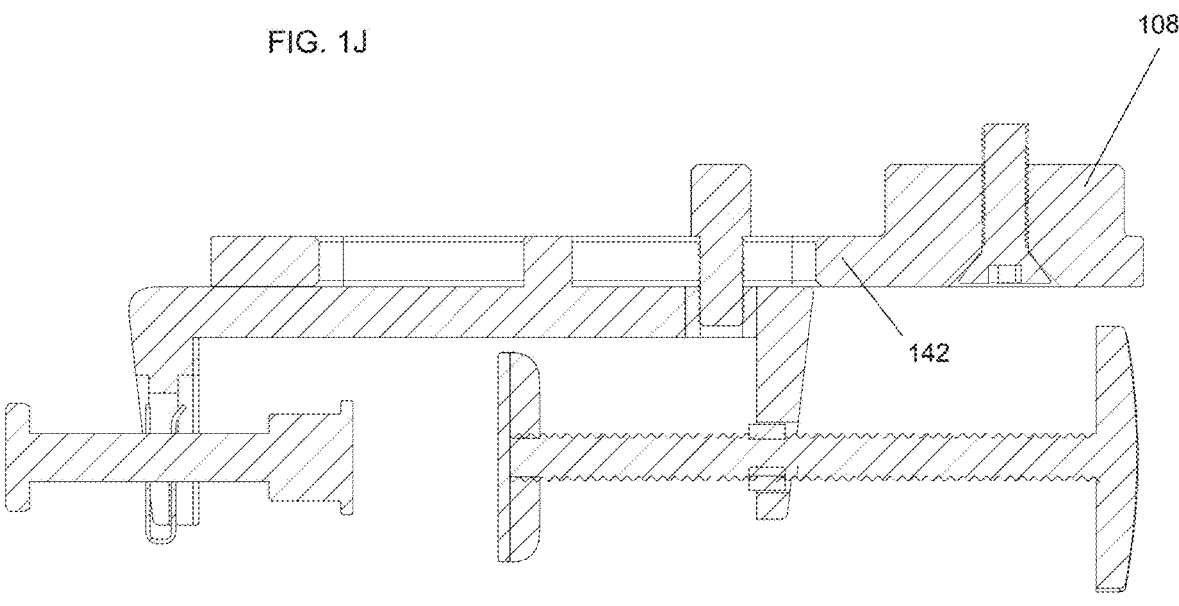

Embodiments of a platform assembly 100, 700, 800 are illustrated, for example, in FIGS. 1A-1F, 7 and 8. The platform assembly is capable of being frictionally engaged to, or clamped onto, a support structure 140, as disclosed in detail below. The support structure may have a rectangular cross section, as illustrated in FIG. 1F. Such a support structure may be made of solid wood, or hollow rectangular or square metal tubing. Alternatively, the support structure may be a right-angle structure, as illustrated in FIG. 1E, such as a piece of angle iron A platform 102 of the platform assembly extends in a horizontal plane and has a top surface 104 and bottom surface 106, as illustrated in FIGS. 1A and 1B. In one embodiment, the platform is a planar surface and is generally oriented in a horizontal plane. However, it is appreciated that the platform's surface may or may not be planar, or not entirely planar, according to an embodiment. Moreover, the platform may be tilted from the horizontal plane, for example, to accommodate reading a book or viewing an object (e.g., a display screen of a computing or electronic device placed on the platform, e.g., an electronic reader or computing tablet.) Optionally, the platform may be a tray or flat shallow container with a raised rim or edge, to hold food or drink or other objects.

Figure 9A:
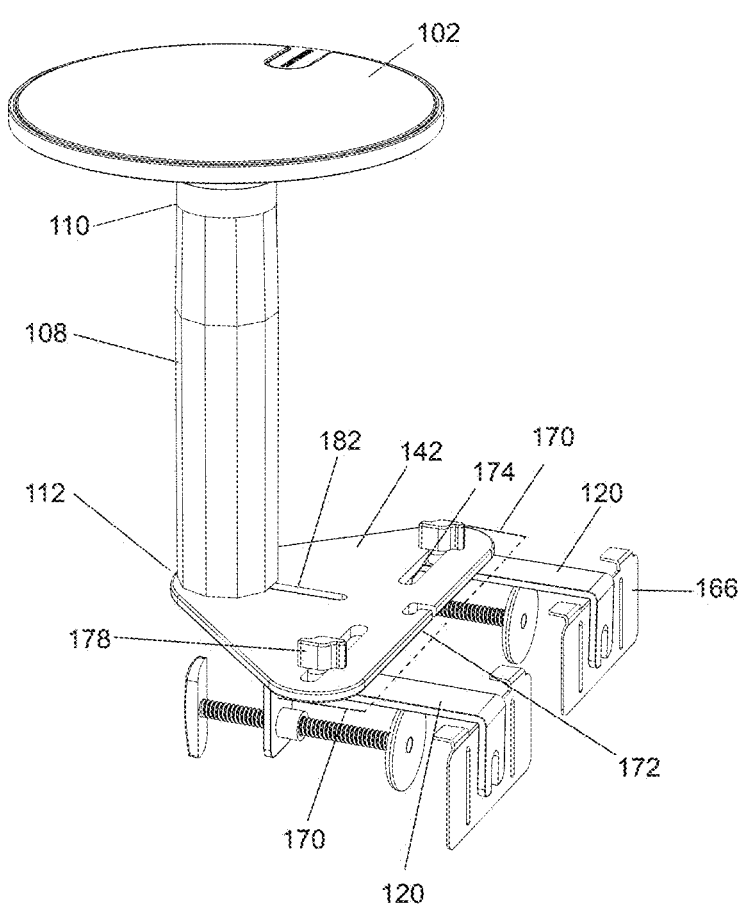
Figure 9B:
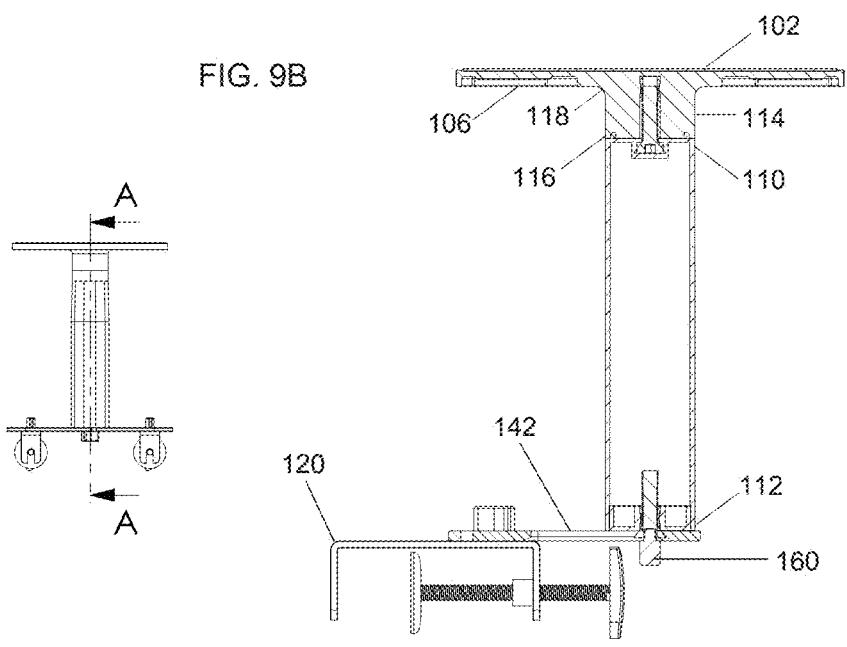
Figure 10A:
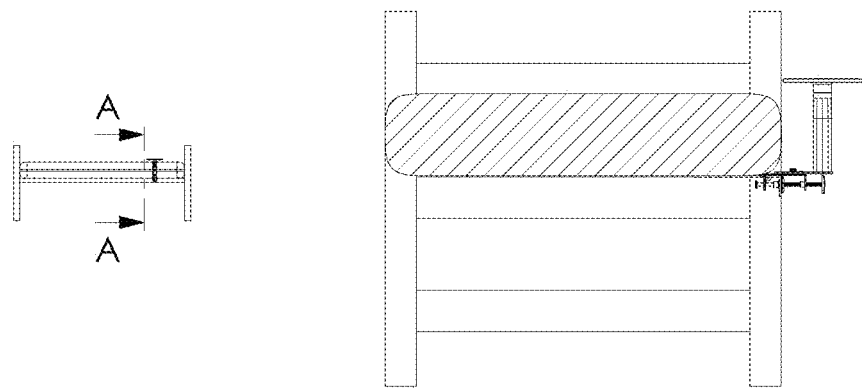
FIGS. 10A-10B illustrate a platform assembly according to an embodiment of the invention.
Figure 10B:
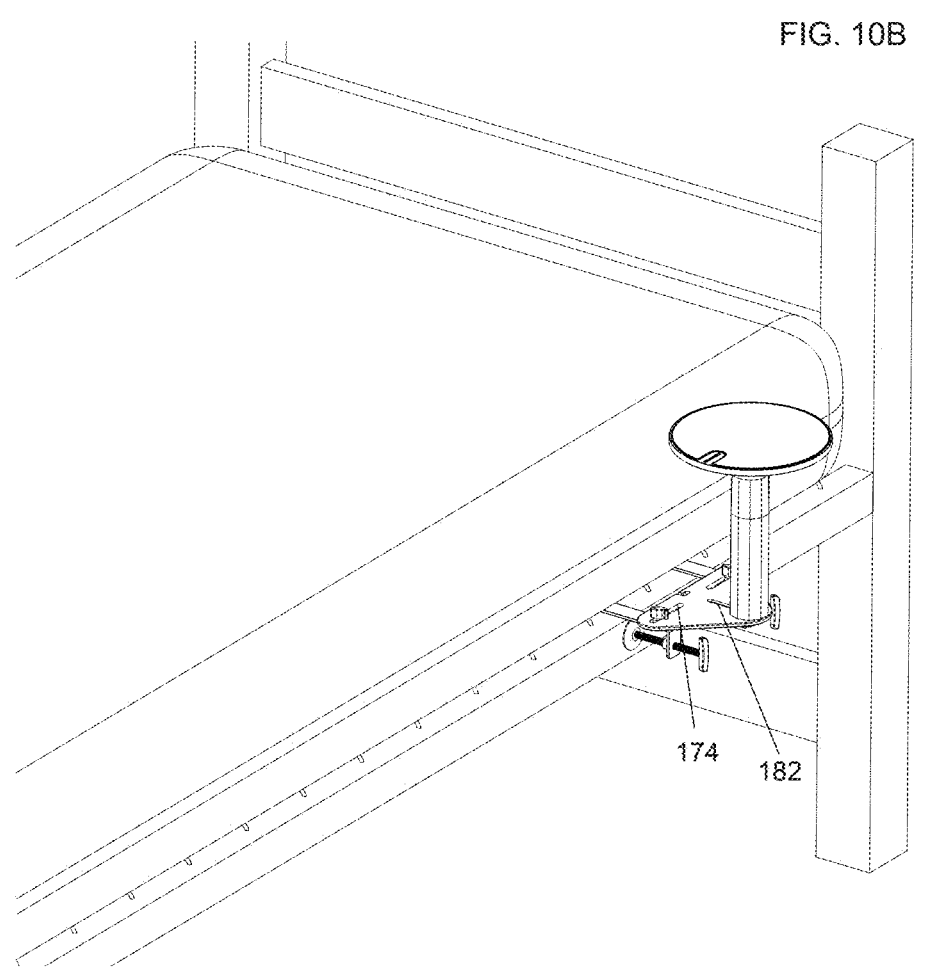
Figure 11A:
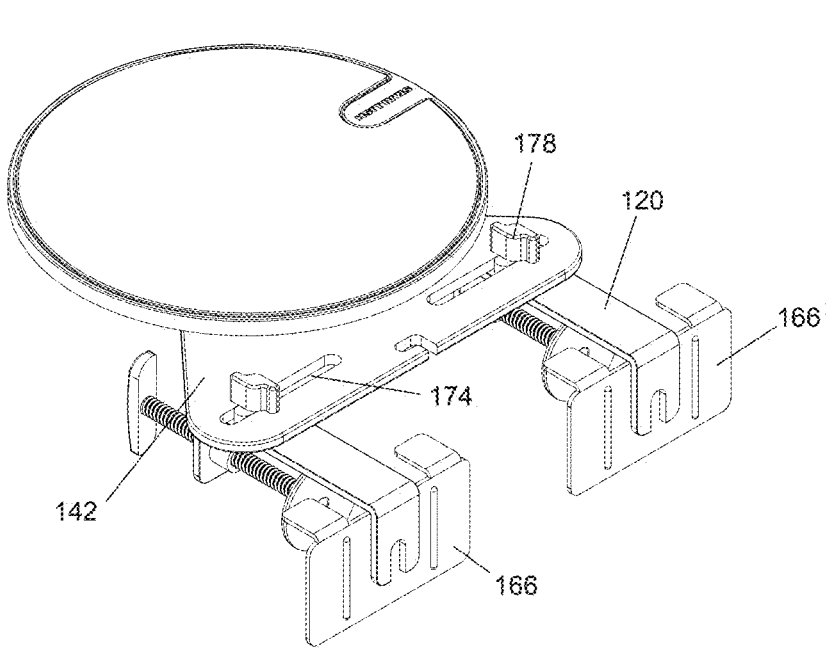
FIGS. 11A-11B illustrate a platform assembly according to an embodiment of the invention.
Figure 11B:
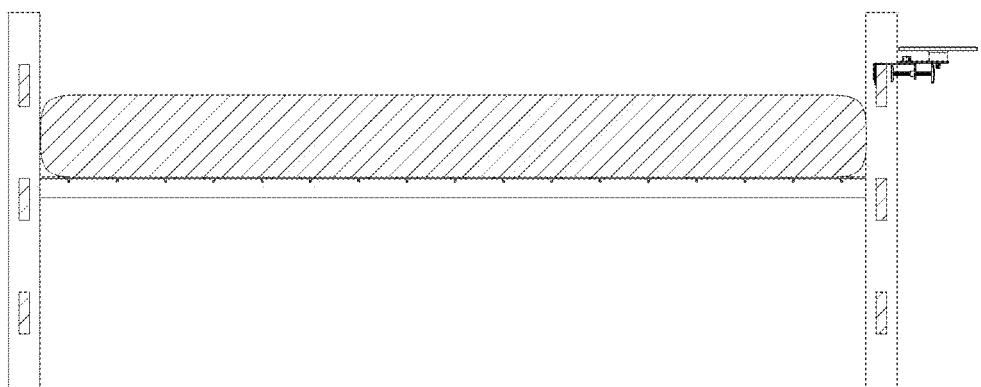
Figure 16A:
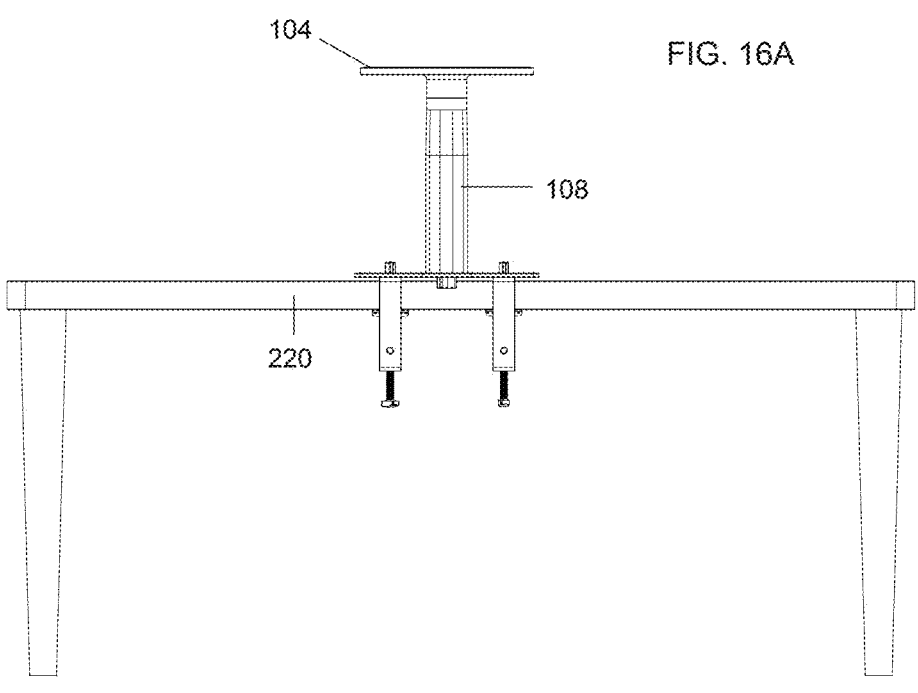
FIGS. 16A-16H illustrate a platform assembly according to an embodiment of the invention.
Figure 16B:
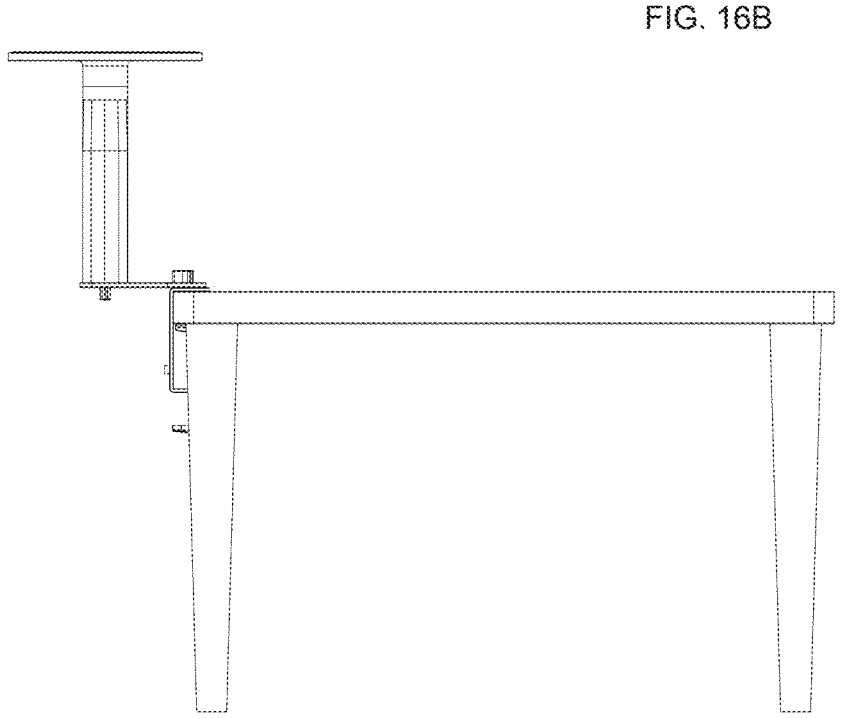
Figure 16C:
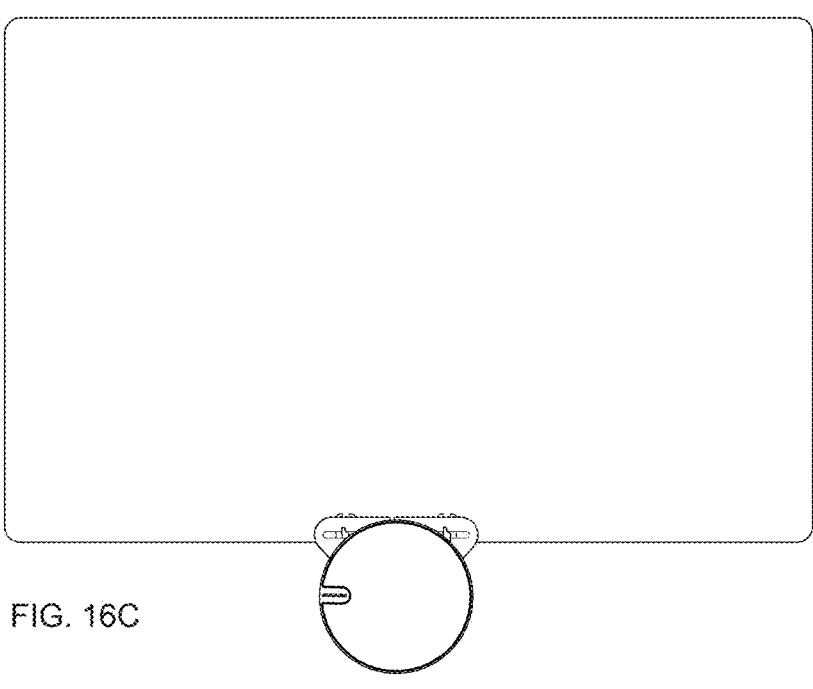
Figure 16D:
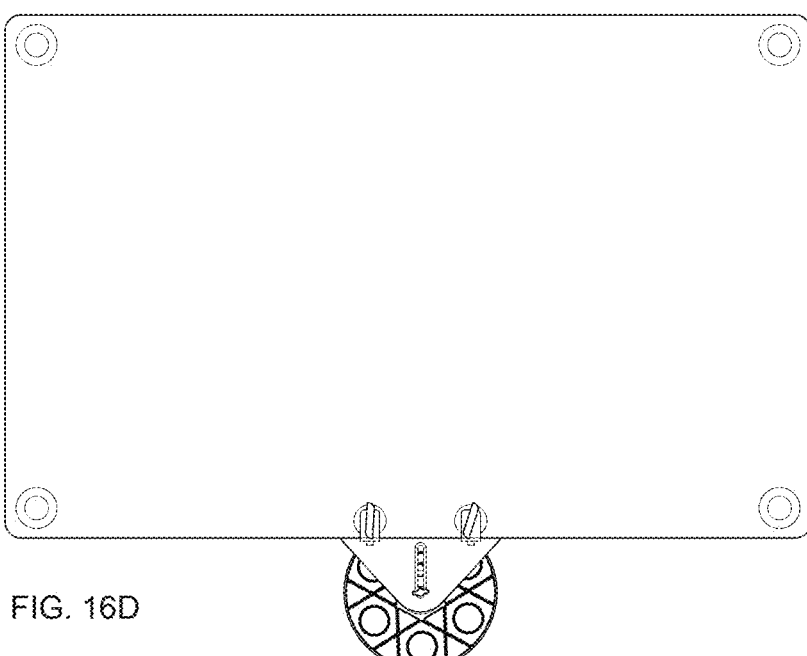
Figure 16E:
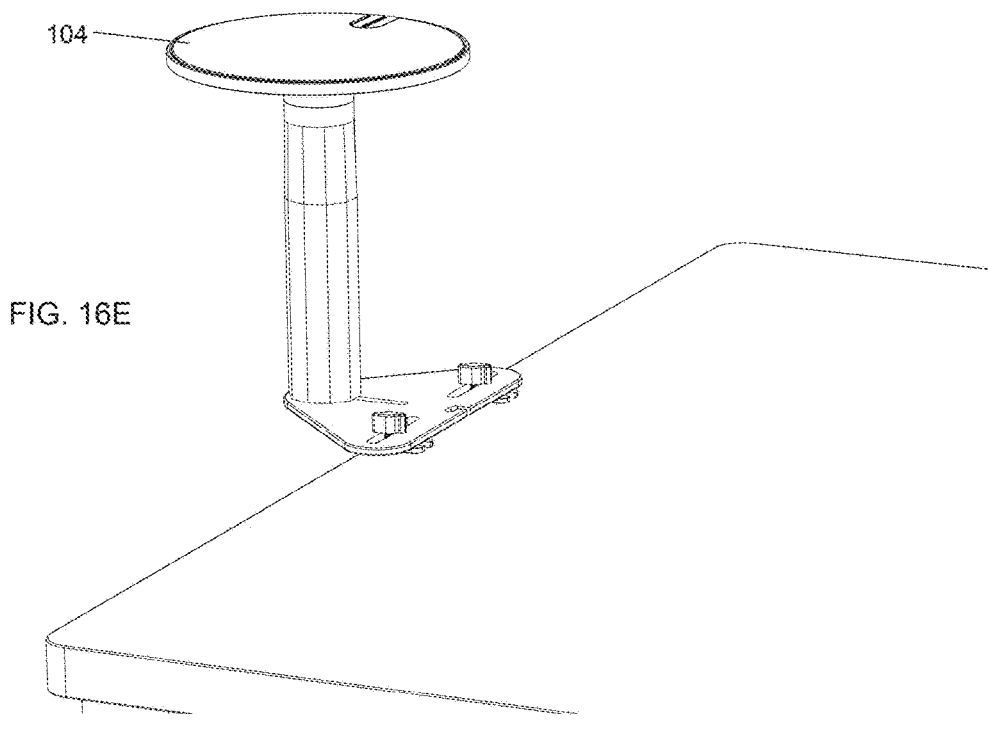
Figure 16F:
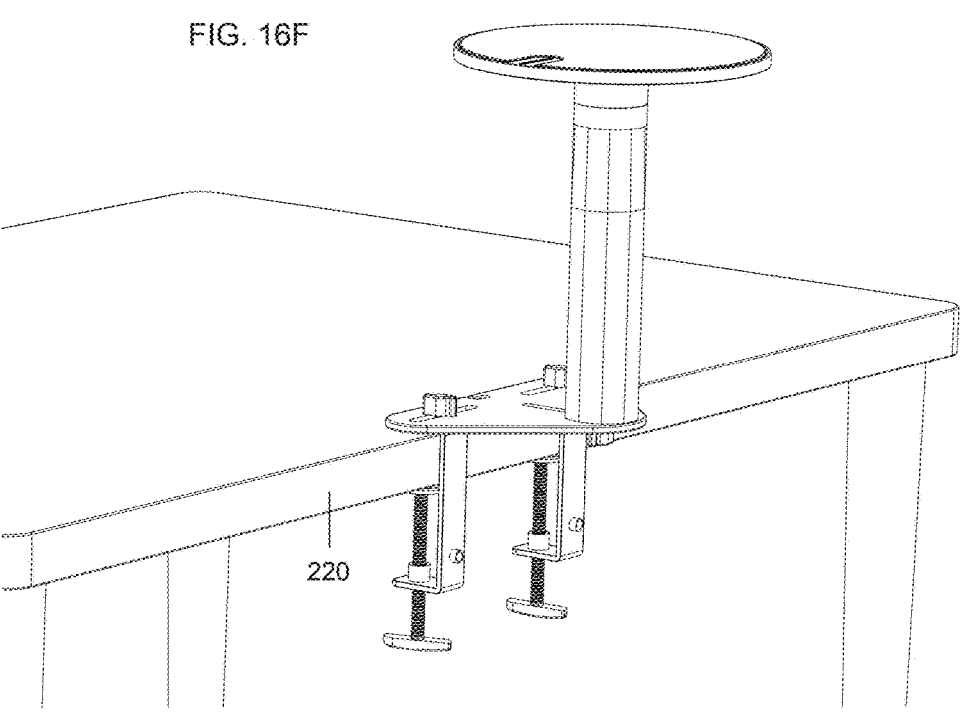
Figure 16G:
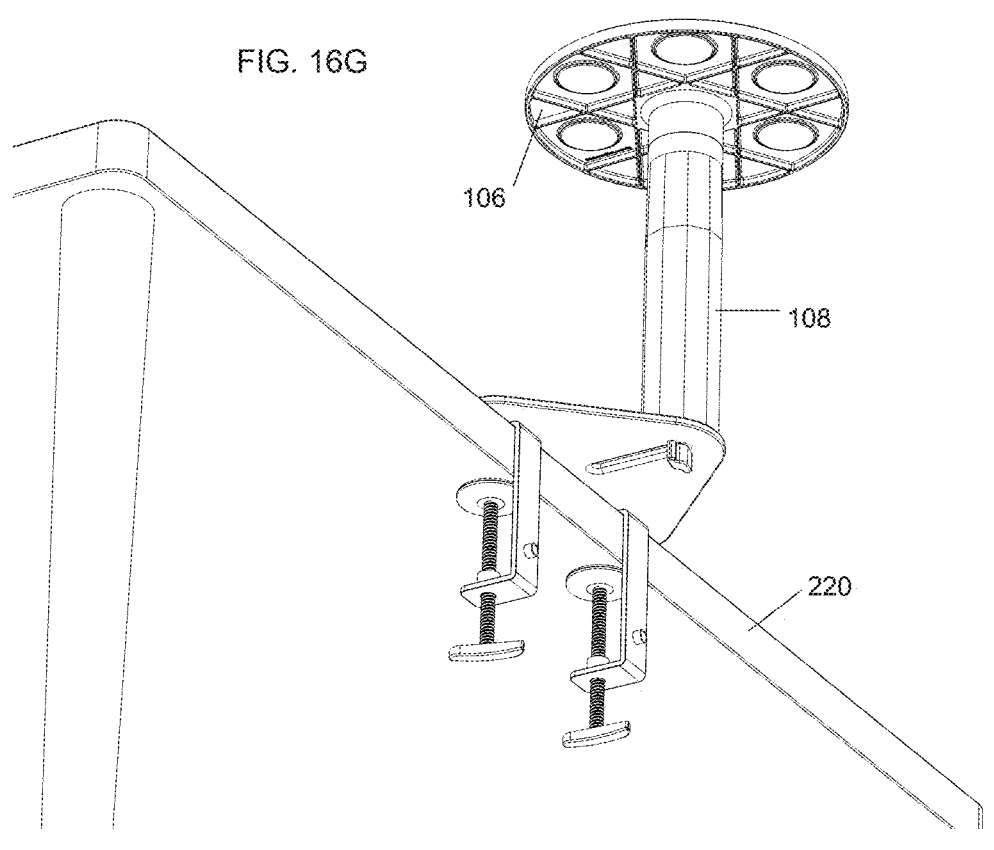
Figure 16H:
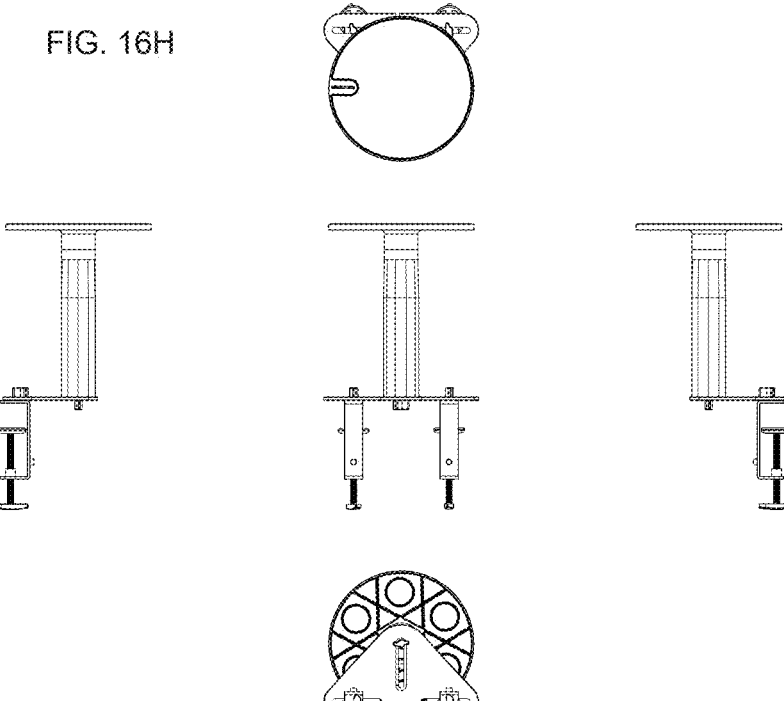
Figure 17C:
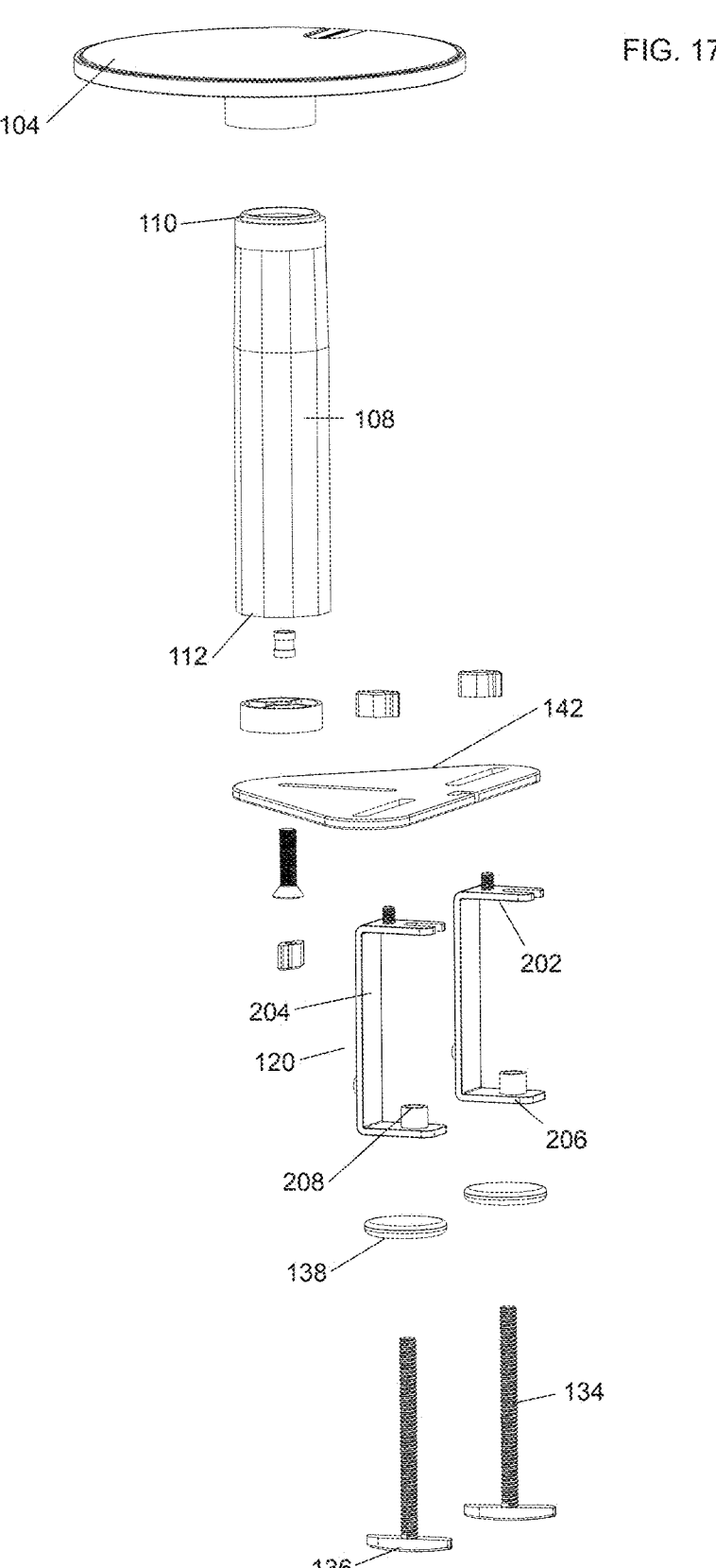

The platform assembly 100 includes a vertical support member 108 that has a top or upper end 110 and a bottom or lower end 112, as illustrated, for example, in FIGS. 1B and 9B. The vertical support member 108 may be a column, post, pole, stand, etc. The top end 110 of the vertical support member 108 is coupled to the bottom surface 106 of platform 102. In one embodiment, platform 102 may include an integrated vertical support column 114 having a lower end 116 that abuts the upper end 110 of vertical support member 108 where vertical support member 108 is coupled to platform 102, and an upper end 118 that abuts the bottom surface 106 of platform 102, as illustrated in FIGS. 1B, 1C and 9B. The vertical support member 108 provides a vertical distance between the bottom surface of the platform 102 and a top surface of a support structure 140. Such spacing may be needed, for example, to provide clearance between an object placed on top of the platform and components or objects coupled to, adjacent, or near the support structure, such as springs, box springs, a mattress, or a table 220 (see, e.g., FIGS. 16A ad 16F).

In an alternative embodiment of the platform assembly, with reference to FIGS. 1B, 5, 11A and 11B, vertical support member 108 may be absent, and platform 102 includes the integrated vertical support column 114 having a lower end 116 that is coupled to a C-clamp 120 or horizontally oriented plate 142, and an upper end 118 that abuts or is coupled to the bottom surface 106 of platform 102. In one embodiment, the integrated vertical support column 114 is manufactured, e.g., molded, with platform 102 as a single component.

Figure 7C:
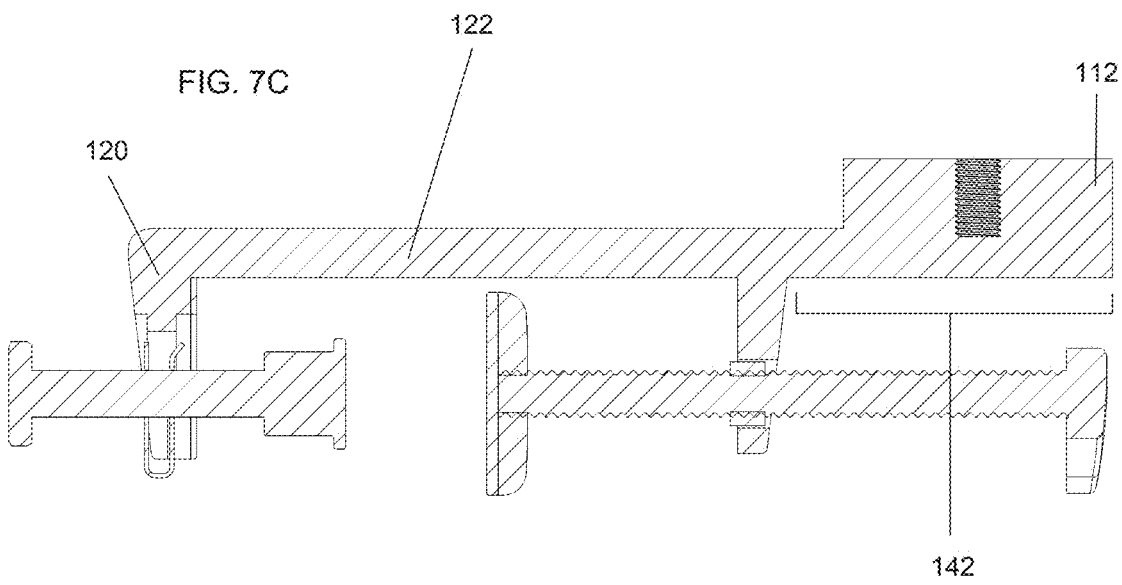

Platform assembly 100 further includes a C-clamp 120 coupled to the bottom or lower end 112 of vertical support member 108. The C-clamp 120 includes a horizontally oriented side 122, and with reference to FIGS. 7A and 8, at least a portion 124 of which is coupled to the bottom end 112 of the vertical support member 108. In an exemplary embodiment, the portion 124 is coupled to the bottom end 112 of vertical support member 108 via a threaded fixing (not illustrated in FIGS. 7 and 8) positioned along a length of the horizontally oriented side of the C-clamp via which to couple the portion of the horizontally oriented side of the C-clamp to the lower end of the vertical support member. In this embodiment, the horizontally oriented side of the C-clamp 122 comprises one or more holes 162 positioned along the length of the horizontally oriented side of the C-clamp any one of which the threaded fixing passes through to couple the portion of the horizontally oriented side of the C-clamp to the lower end of the vertical support member. According to one embodiment, the threaded fixing comprises a bolt with external male threads that passes through the hole positioned along the length of the horizontally oriented side of the C-clamp to mate with a nut with internal female threads embedded at the lower end of the vertical support member to couple the portion of the horizontally oriented side of the C-clamp to the lower end of the vertical support member. C-clamp 120 further includes a first vertically oriented side 126 meeting the horizontally oriented side 122 at a first corner of the C-clamp 120 and extending downward. The C-clamp 120 further includes a second vertically oriented side 128 meeting the horizontally oriented side 122 at a second corner of the C-clamp 120 and extending downward. The second vertically oriented side includes a threaded hole 130, as illustrated in FIG. 1D. Alternatively, the horizontally oriented side may extend beyond the second vertically oriented side 128. FIGS. 7B and 7C illustrate a disclosed embodiment for the platform assembly in which a portion 124 of a horizontally oriented side 122 of a C-clamp 120 is molded or 3D-printed with the vertical support member as a single component of the platform assembly.

The C-clamp 120 includes a screw 132 comprising a threaded shaft 134, a handle 136 at a first end of the screw, and a shoe 138 at a second end of the screw. The second end of the screw passes through the threaded hole 130 of the second vertically oriented side 128 of the C-clamp 120 and extends horizontally toward the first vertically oriented side 126 of the C-clamp 120. Moving, e.g., twisting, the handle 136 causes the second end of the screw to further extend or move horizontally toward the first vertically oriented side 126 of the C-clamp 120 such that the shoe 138 and the first vertically oriented side 126 of the C-clamp 120 frictionally engage the support structure 140 when the support structure 140 is positioned between the first and second vertically oriented sides 126, 128 of the C-clamp 120. In some embodiments, the shoe 138 may be a spinnable or movable turntable or shoe, wherein the turntable or shoe is affixed to the second end of the screw by a rivet of the like and can rotate about the long axis of the screw and/or pivot or move angularly a limited amount with respect to a plane normal to the long axis of the screw, for example, to better accommodate clamping against a support structure 140.

Figure 8:
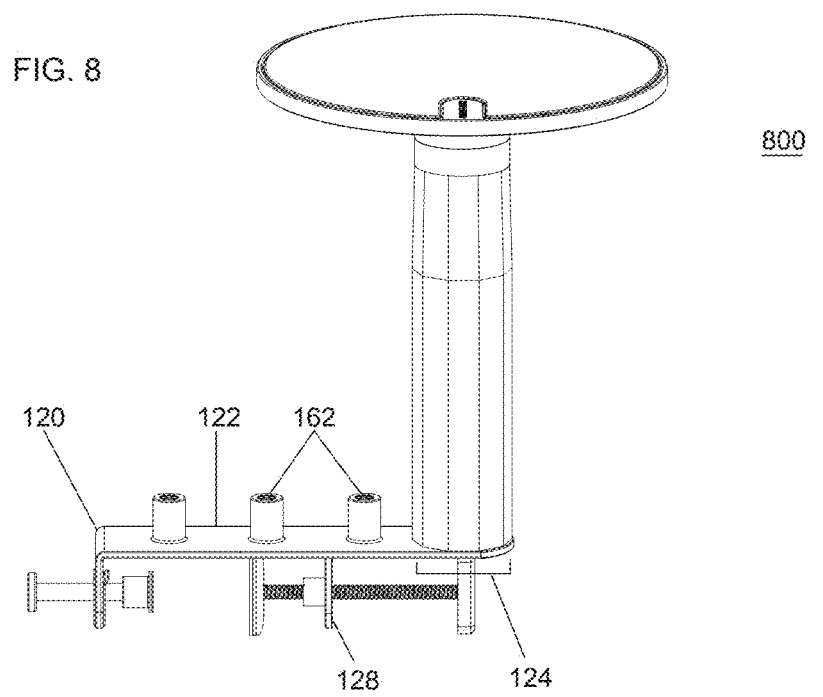
FIG. 8 illustrates a platform assembly according to an embodiment of the invention.

With reference to, for example, FIGS. 1A-1F, 2A-2E, 3A, 3B, 4A, 4B, 5, 6A-6C, 9A-9D, 10A, 10B, 11A-11B, and 12-15, the portion 124 of the horizontally oriented side 122 of the C-clamp 120 that is coupled to the lower end 112 of the vertical support member 108 in FIGS. 7 and 8, according to an alternative embodiment, comprises a horizontally oriented plate 142 coupled to the lower end 112 of the vertical support member 108 and at least a portion of the horizontally oriented side 122 of C-clamp 120 abutting or coupled to the horizontally oriented plate 142. Thus, in this alternative embodiment, the C-clamp is coupled to the lower portion of the vertical support member via an intermediate element or component, that is, the horizontally oriented plate 142. With reference to some of these same figures, according to some embodiments, a second C-clamp is coupled to the lower portion of the vertical support member via a second intermediate element or component, that is, a second horizontally oriented plate 142. With reference to FIGS. 1G-1J, according to another embodiment, the horizontally oriented plate 142 may be molded or 3D-printed with the vertical support member 108 as a single component. With reference to FIGS. 7B and 7C, additionally, or alternatively, the horizontally oriented plate 142 may be molded or 3D-printed with at least a portion of the horizontally oriented side 122 of C-clamp 120 as a single component. Thus, in this alternative embodiment, the C-clamp is coupled to the horizontally oriented plate 142 and/or the lower portion of the vertical support member as a single element or component. With reference to some of these same figures, according to some embodiments, a second C-clamp likewise may be integrated with the first C-clamp, the horizontally oriented side 122 of C-clamp 120 and the horizontally oriented plate 142 as a single component.

In one disclosed embodiment, the portion of the horizontally oriented side 122 of C-clamp 120 abutting or coupled to horizontally oriented plate 142 is slidably abutting or coupled to horizontally oriented plate 142. As illustrated, for example, in FIGS. 1A and 6A, horizontally oriented plate 142 includes an elongated aperture 174. A threaded fixing, e.g., threaded bolt 176, is positioned along a length of the horizontally oriented plate and passes through the elongated aperture 174 and can be turned to increase friction between the horizontally oriented plate 142 and horizontally oriented side 122 of C-clamp 120 such that the relative positions of the horizontally oriented side 122 of C-clamp 120 abutting or coupled to horizontally oriented plate 142 are fixed. In an alternative embodiment, illustrated for example in FIGS. 2A, 4A, 9A and 11A, a threaded fixing may be affixed at a position along a length of the horizontally oriented side of C-clamp and extend upward through the elongated aperture, where a nut, e.g., wing nut 178, may be turned on the thread fixing to increase the friction between the horizontally oriented plate and the horizontally oriented side 122 of C-clamp 120. A pin or post 179 affixed to the horizontally oriented side 122 of C-clamp 120 may also pass through the elongated aperture 174 to guide and align the horizontally oriented plate 142 with respect to the horizontally oriented side 122 of C-clamp 120. In this manner, platform 102 can be moved in or out so that it is some intermediate distance from the support member 140 (e.g., see FIG. 6A), or closest to or a minimum distance from support member 140 (e.g., see FIG. 6B) or furthest away or a maximum distance from support member 140 (e.g., see FIG. 6C).

Figure 12:
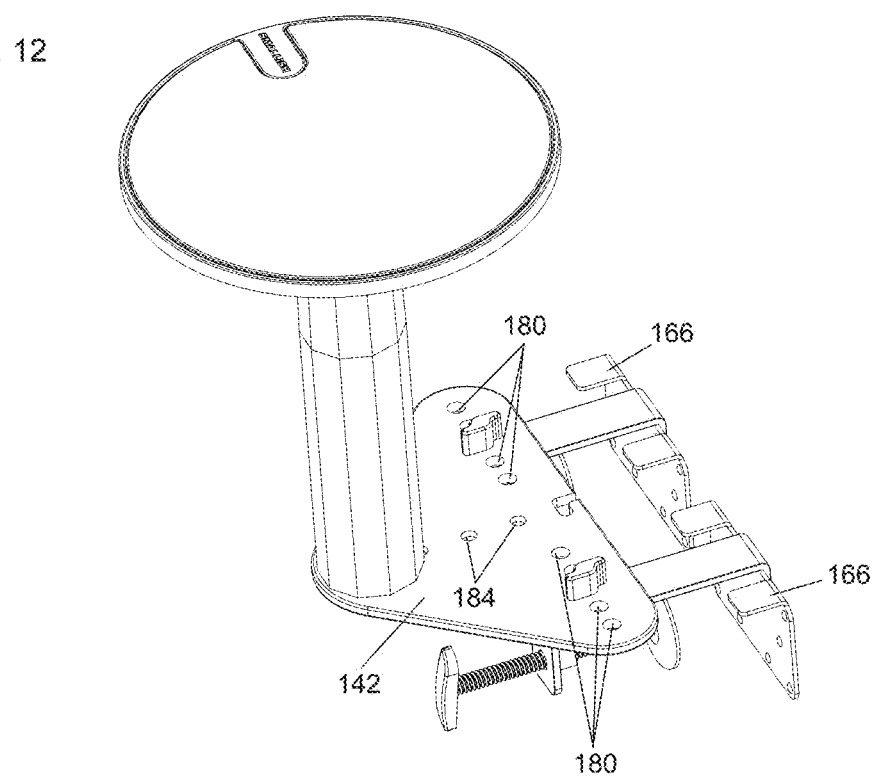
FIG. 12 illustrates a platform assembly according to an embodiment of the invention.
Figure 13:
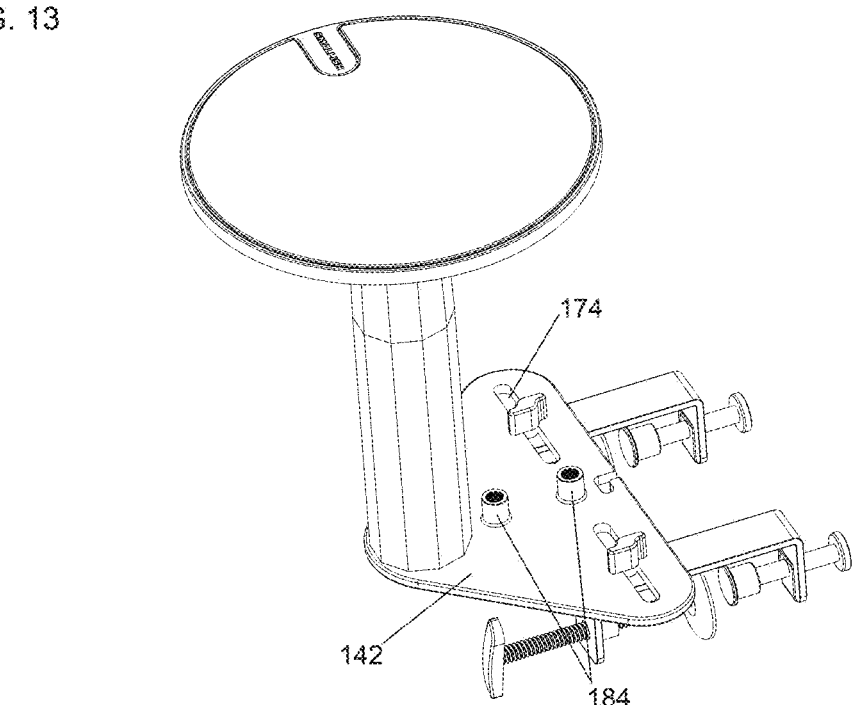
FIG. 13 illustrates a platform assembly according to an embodiment of the invention.
Figure 14:
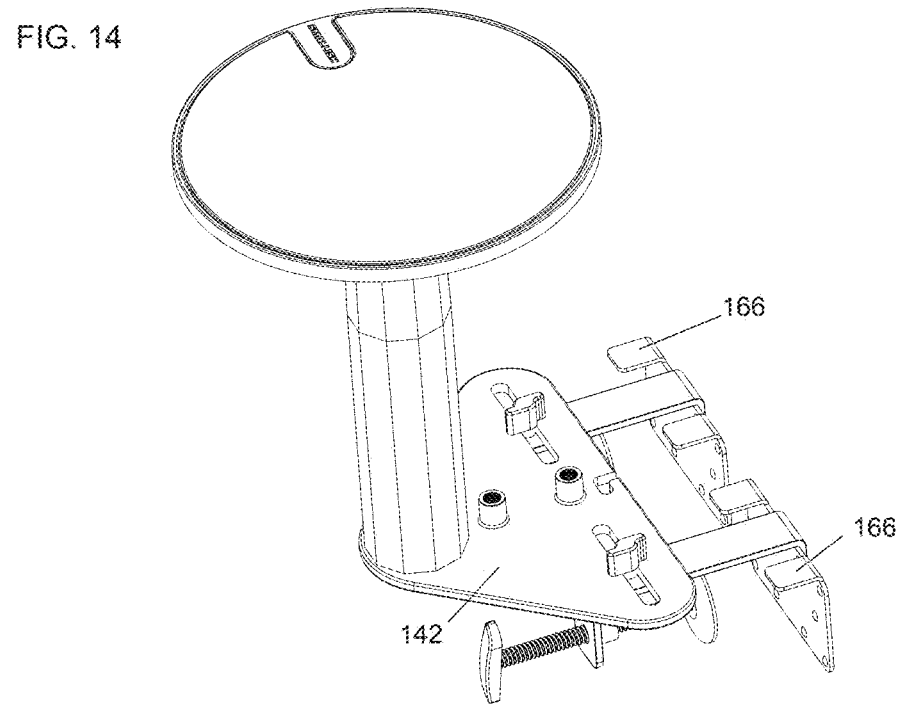
FIG. 14 illustrates a platform assembly according to an embodiment of the invention.
Figure 15:
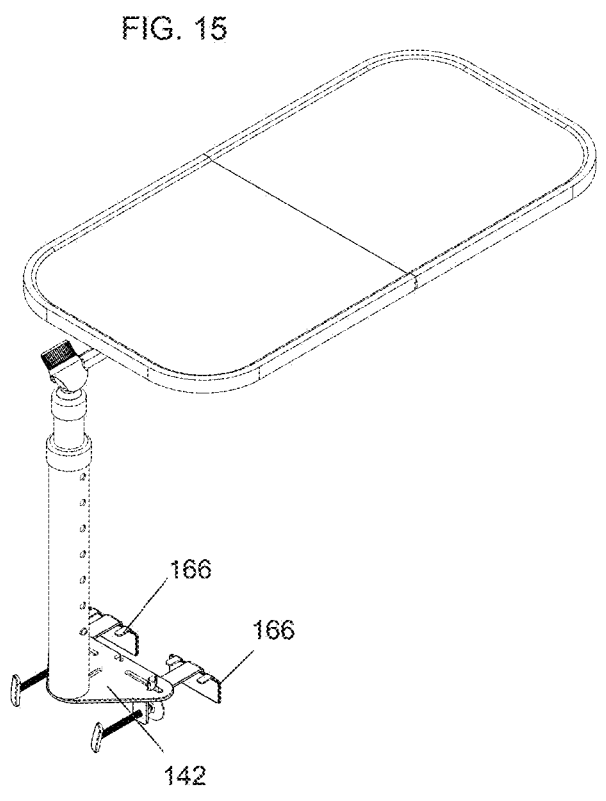
FIG. 15 illustrates a platform assembly according to an embodiment of the invention.

In one disclosed embodiment, with reference to FIGS. 9A-9D, 10A, 10B, 11A, 11B and 12-15, respective portions of horizontally oriented sides 122 of a pair of C-clamps 120 abutting or coupled to horizontally oriented plate 142 are slidably abutting or coupled to horizontally oriented plate 142. As illustrated, horizontally oriented plate 142 includes respective elongated apertures 174, or a plurality of holes 180 (FIG. 12). A threaded fixing, e.g., threaded bolt 176, is positioned along a length of the horizontally oriented plate and passes through the elongated aperture 174 or one of the plurality of holes and can be turned to increase friction between the horizontally oriented plate 142 and horizontally oriented side 122 of a respective C-clamp 120 such that the relative positions of the horizontally oriented side 122 of C-clamp 120 abutting or coupled to horizontally oriented plate 142 are fixed.

In one disclosed embodiment, with reference to FIGS. 9A-9D, 10A, 10B, 11A, 11B and 12-15, the lower end 112 of vertical support member 108, or the lower end 110 of integrated vertical support member 114 is slidably abutting or coupled to horizontally oriented plate 142. As illustrated, horizontally oriented plate 142 includes an elongated aperture 182 (see e.g., FIGS. 9A, 9C, and 10B), or a plurality of holes 184 (see, e.g., FIGS. 12-14). A threaded fixing, e.g., threaded bolt 176, is positioned along a length of the horizontally oriented plate and passes through the elongated aperture 182 or one of the plurality of holes 184 and can be turned to increase friction between the horizontally oriented plate 142 and the lower end of the vertical support member 108 such that the relative positions of the vertical support member abutting or coupled to horizontally oriented plate 142 are fixed.

The C-clamp may be made from metal or steel, for example, as illustrated in FIGS. 1A-1F and 2A-2E, or plastic, for example, as illustrated in FIGS. 3A, 3B, 4A and 4B. The thickness of the plastic may vary such that thickness of the horizontally oriented side 122 may be thicker than the vertically oriented sides, or the vertically oriented sides may taper a greater thickness at or near the respective corner with the horizontally oriented side to a lesser thickness at or near the ends of the vertically oriented sides, depending on the rigidity and strength of the material used to make the C-clamp.

The horizontally oriented plate may be made from wood product (such as bamboo, hardboard, or an engineered wood product, such as plywood, strand board, or medium density fiberboard (MDF), or materials made from recycled paper, such as Richlite or PaperStone®), metal, plastic (e.g., Melamine, polycarbonate, plastic infused with glass, or Acrylonitrile Butadiene Styrene (ABS) plastic), or a combination of such or other products. The horizontally oriented plate 142 may only consist of an upper planar surface. Optionally, the horizontally oriented plate may include a raised edge, rib, lip, or rim around some or all of the perimeter of the planar surface (not illustrated). Although horizontally oriented plate 142 is illustrated as having a rectangular or triangular shape in the accompanying drawings, it is appreciated that the horizontally oriented plate 142 could be any shape such a polygon, circle, or oval shape. Although the horizontally oriented plate 142 is illustrated as being coupled to the respective horizontally oriented sides of two C-clamps, for example, in FIGS. 9A-9D, 10A, 10B, 11A, 11B, 12-15, the widths of which are relatively short compared to the length 170 of edge 172 (See FIGS. 9A, 9C), it is appreciated that a single C-clamp may extend along much or all the length of edge 172, or more than two C-clamps may be positioned along edge 172.

With reference to, for example, FIGS. 1A-1F, 5, 9A, 9C, 11A, 12, 14 and 15, platform assembly may include a vertically oriented backing plate, or simply, a vertically oriented plate 166 that abuts the inside surface of the first vertically oriented side 126 of the C-clamp 120. In this embodiment, C-clamp 120 includes a screw 132 comprising a threaded shaft 134, a handle 136 at a first end of the screw, and a shoe 138 at a second end of the screw. The second end of the screw passes through the threaded hole 130 of the second vertically oriented side 128 of the C-clamp 120 and extends horizontally toward the first vertically oriented side 126 of the C-clamp 120 and the vertically oriented plate 166 abutting the inside surface of the first vertically oriented side 126 of the C-clamp 120. Moving, e.g., twisting, the handle 136 causes the second end of the screw to further extend or move horizontally toward the first vertically oriented side 126 of the C-clamp 120 and the vertically oriented plate abutting the inside surface of the first vertically oriented side of the C-clamp such that the shoe 138 and the first vertically oriented side 126 of the C-clamp 120 and the vertically oriented plate abutting the inside surface of the first vertically oriented side of the C-clamp frictionally engage the support structure 140 when the support structure 140 is positioned between the first vertically oriented side 126 of the C-clamp abutting the vertically oriented plate, and second vertically oriented side 128 of the C-clamp 120.

With reference to FIGS. 1A-1F and 9A-9D, according to embodiments, one or more C-clamps 120 may be used to frictionally engage the support structure 140. For example, FIG. 9D illustrates a pair of C-clamps 120 installed to frictionally engage the support structure 140. Depending on the size of a horizontally oriented plate 142 (described further below), in particular, the length of the horizontally oriented plate 142 in the direction parallel to the support structure 140, and/or depending on the size of the C-clamp(s) 120, and/or depending on the size of the support structure 140, three or more C-clamps 120 may be used to frictionally engage the support structure 140.

While the embodiment illustrated in FIGS. 1A-IF contemplates the screw 132 passing through the threaded hole 130 of the second vertically oriented side 128 of the C-clamp 120, it is possible to essentially reverse the C-clamp 120 so that screw 132 passes through a threaded hole of the first vertically oriented side 126 of the C-clamp 120. In either case, the C-clamp forms an opening that spans the support structure, and one vertically oriented side of the C-clamp functions as a fixed jaw that contacts the support member, while the other vertically oriented side has a threaded fixing that passes through a threaded hole, such as a threaded bolt with a shoe, which functions as a movable jaw that contacts and frictionally engages the other, opposite, side of the support structure when the handle is turned.

Figure 2A:
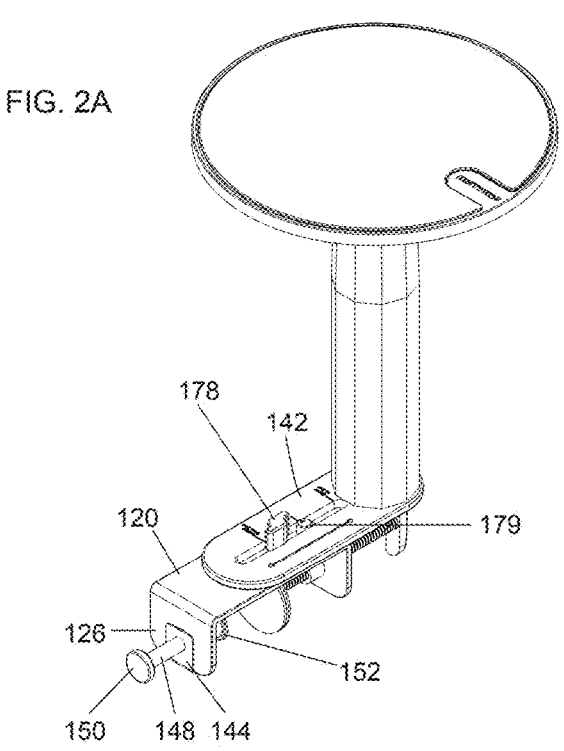
FIGS. 2A-2E illustrate a platform assembly according to an embodiment of the invention.
Figure 2B:
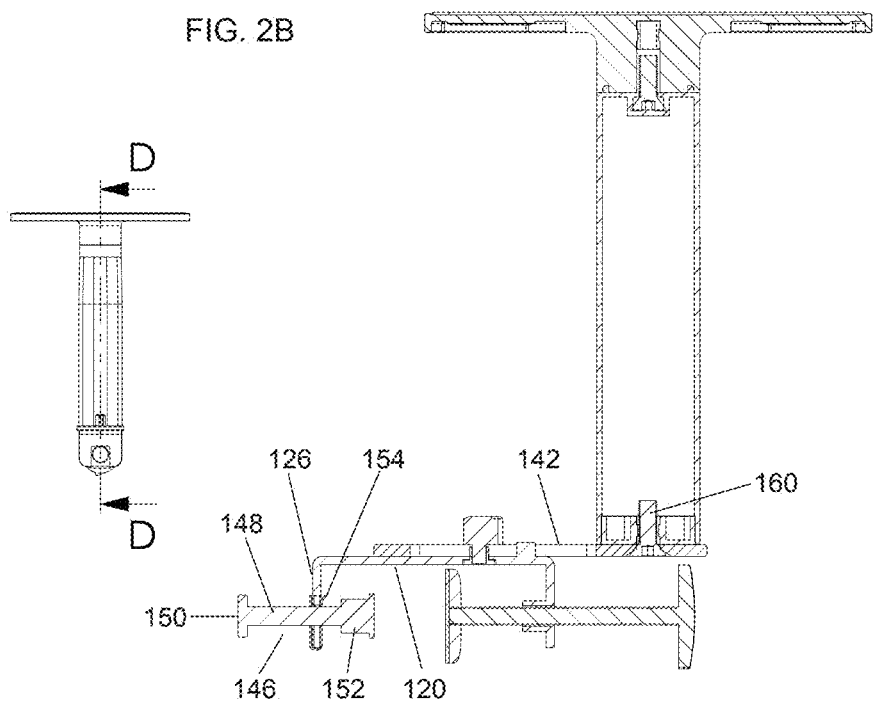
Figure 2C:
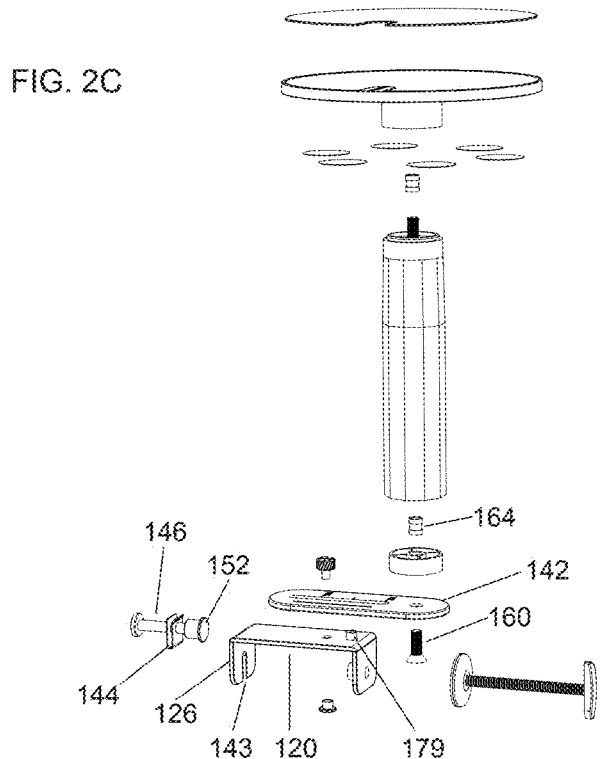
Figure 2D:
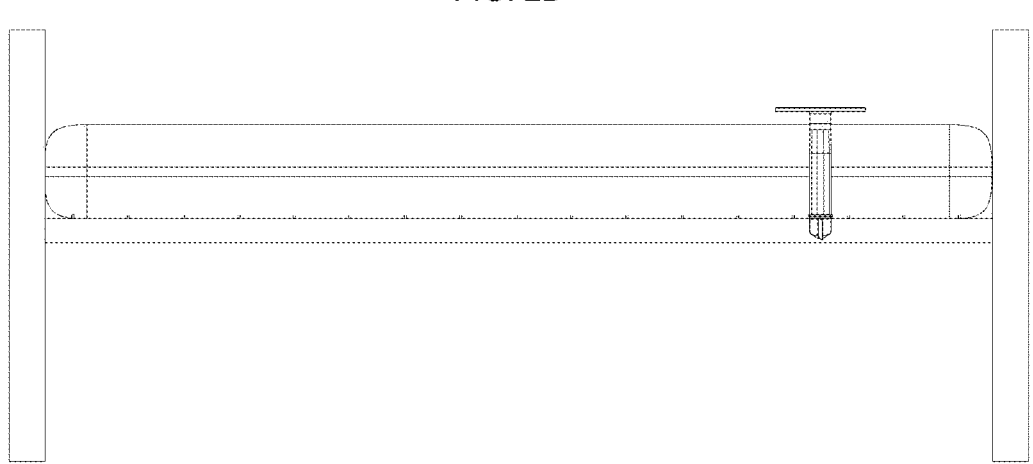
Figure 2E:
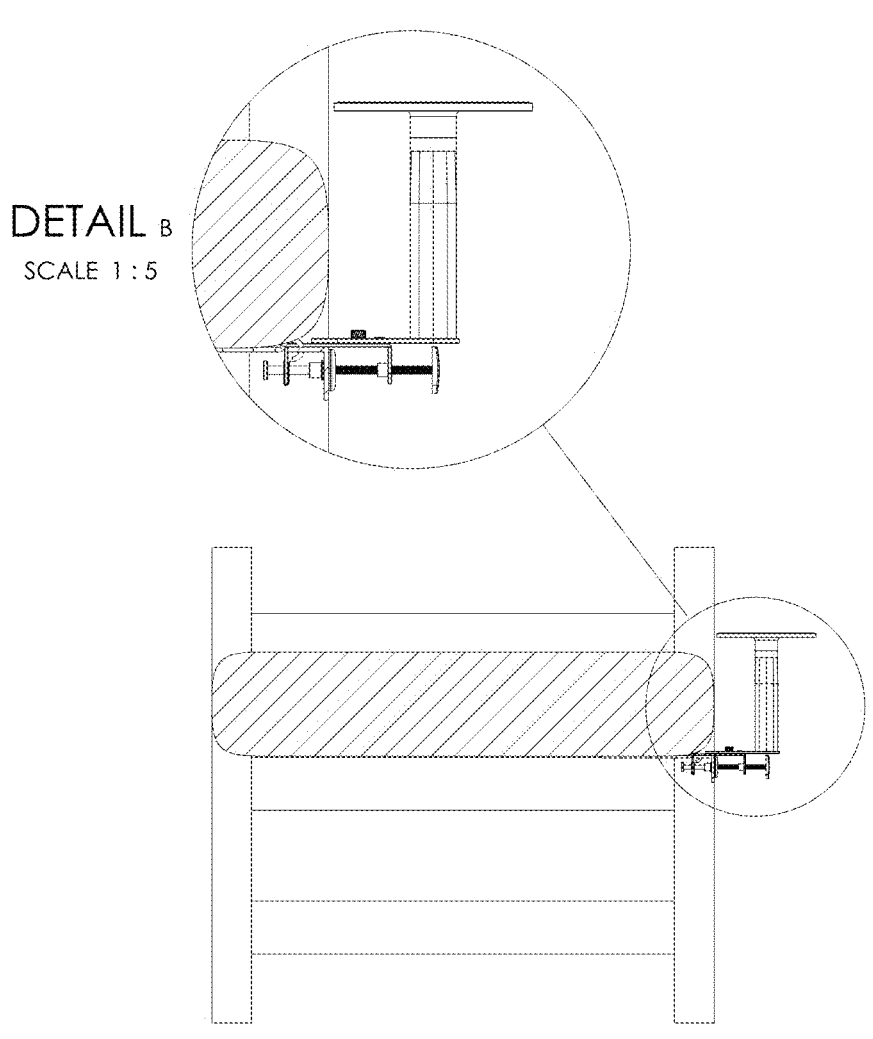
Figure 3A:
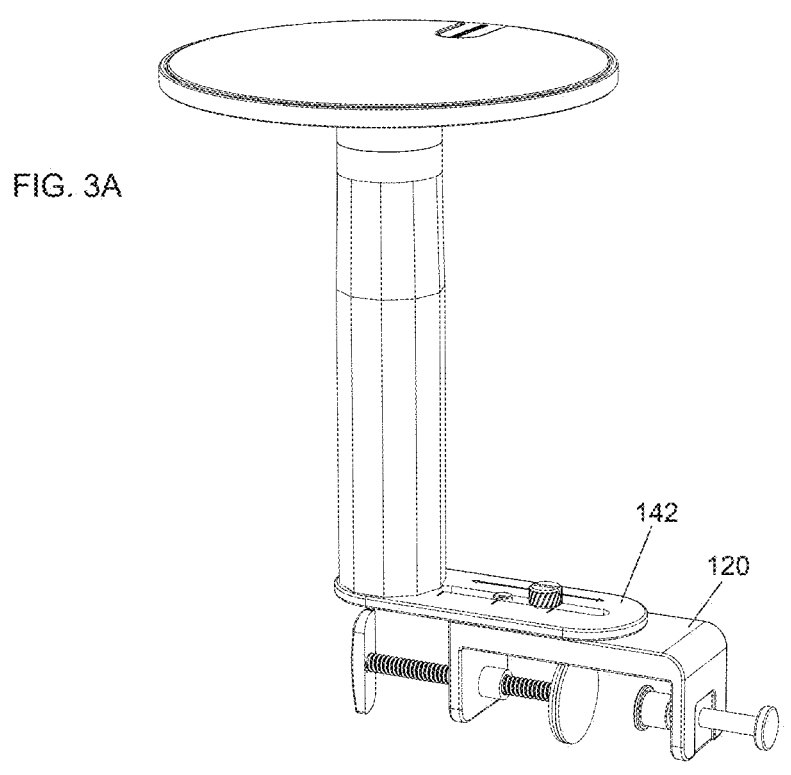
FIGS. 3A and 3B illustrate a platform assembly according to an embodiment of the invention.
Figure 3B:
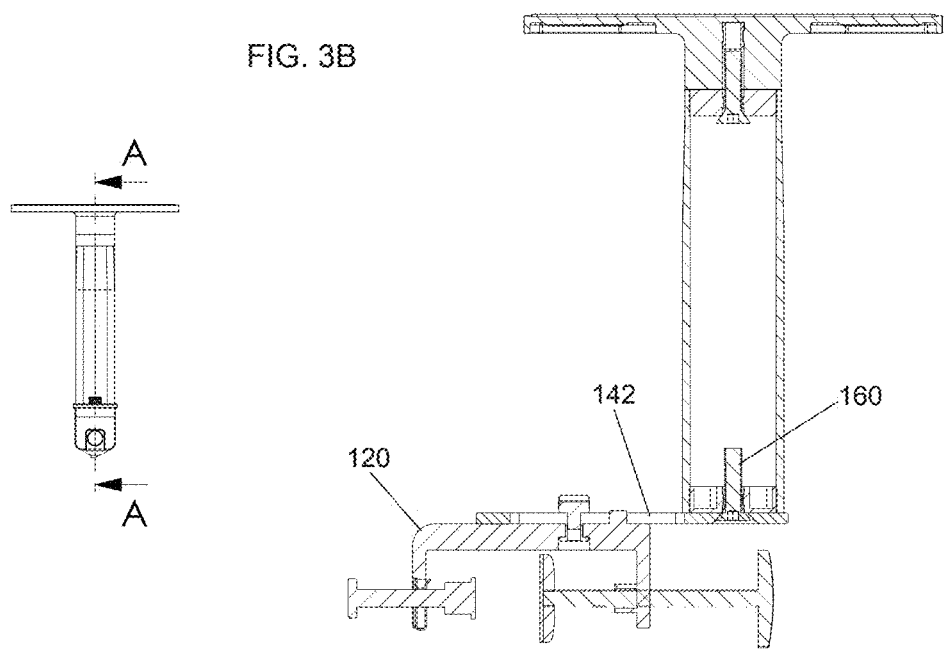
Figure 4A:
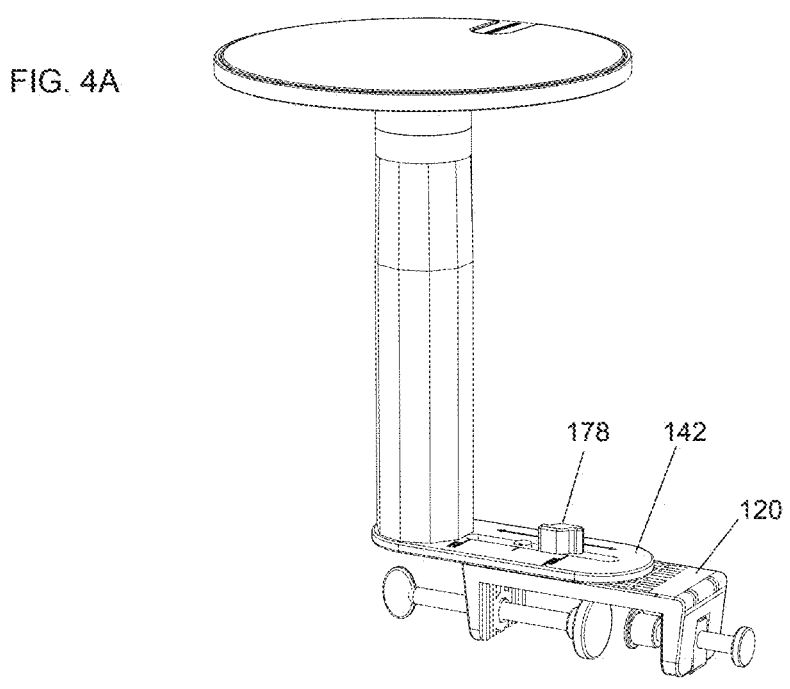
FIGS. 4A-4B illustrate a platform assembly according to an embodiment of the invention.
Figure 4B:
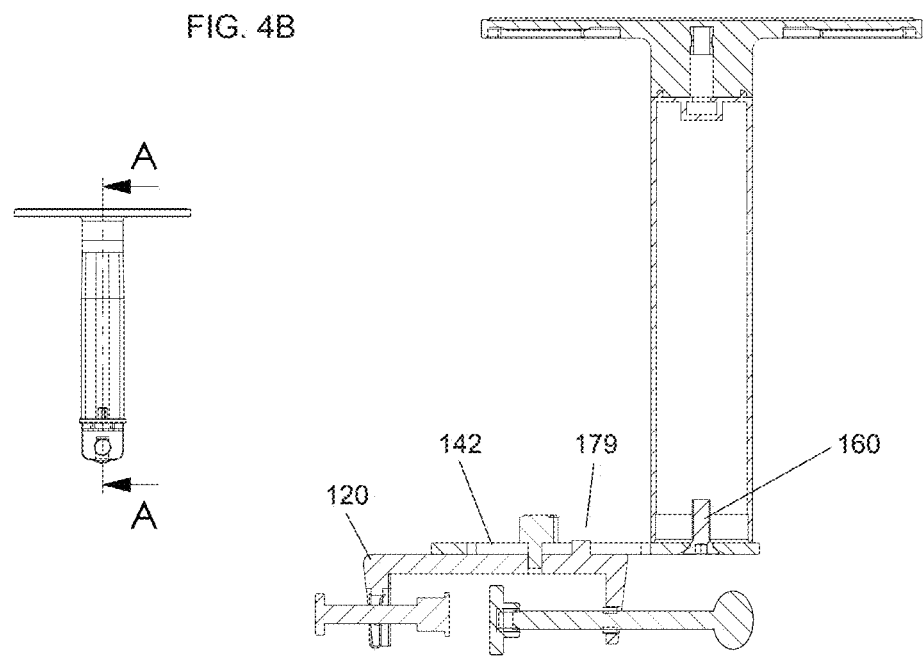
Figure 5:
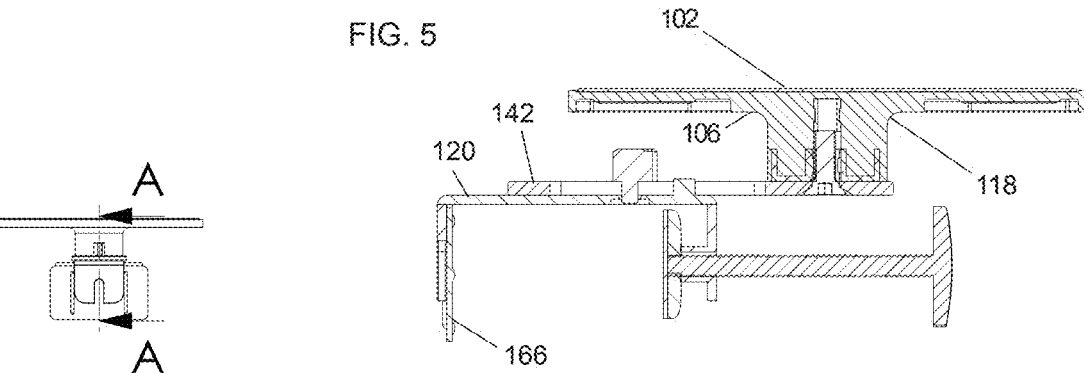
FIG. 5 illustrates a platform assembly according to an embodiment of the invention.
Figure 6A:
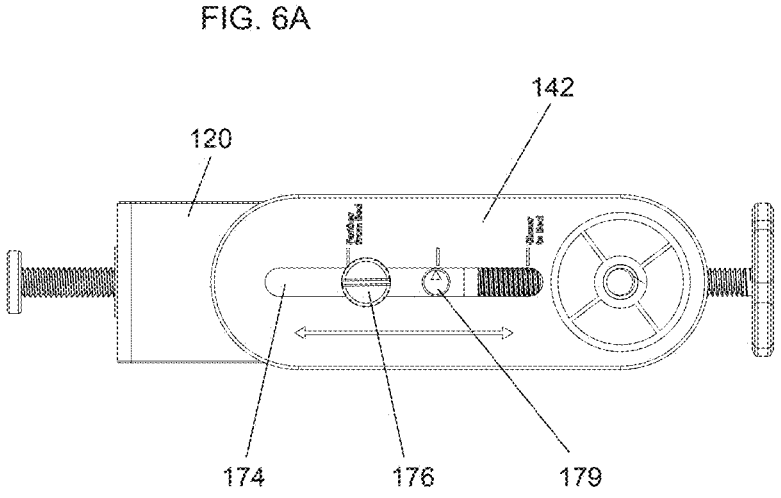
FIGS. 6A-6C illustrate aspects of a platform assembly according to an embodiment of the invention.
Figure 6B:
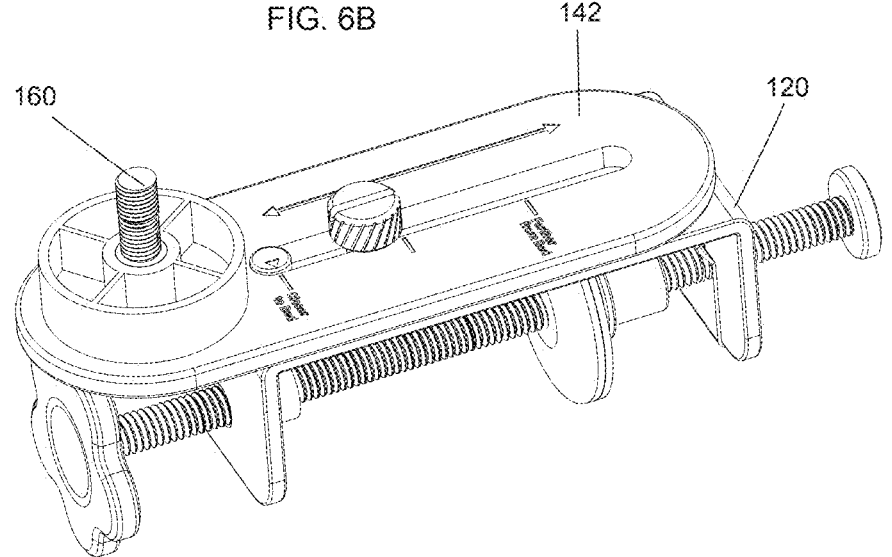
Figure 6C:
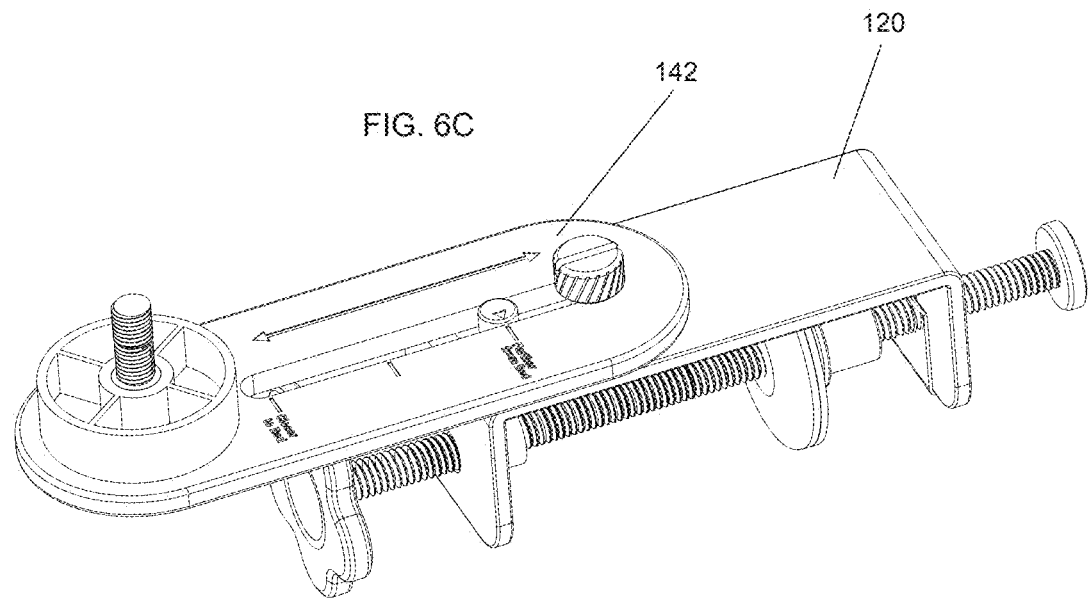

According to another embodiment, with reference to FIGS. 2A-2E, 3A-3B, 4A-4B, 6A-6C, 7, 8 and 13, the C-clamp 120 may include two movable jaws each of which contacts and frictionally engages a respective side of the support structure to secure the platform assembly to the support structure. For example, the first vertically oriented side 126 of the C-clamp 120 also includes a threaded hole, for example, the threaded hole created by the combination of slot 143 and clip 144, and a second bolt or screw 146 comprising a threaded shaft 148, a handle or head 150 at a first end of the second screw, and a shoe or pad 152 at a second end of the second screw. The second end of the second screw passes through the threaded hole, for example, the threaded hole created by slot 143 and clip 144 slidably engaged with the slot. According to one embodiment, clip 144 includes a punched in portion 154 on one side (e.g., the inside) of the clip that acts as a spring that biases against, or presses on, a surface of the first vertically oriented side 126 so that the clip 144, or at least the punched in portion of the clip, presses against, and frictionally engages, the surface of the first vertically oriented slide of slot 143 when the clip is slipped into place over the slot. In one embodiment, a pair of horizontally aligned openings, one in each of the respective sides of the clip, act like an internal female threaded hole and engage external threads of the screw, so that the screw can be inserted in the first vertically oriented side 126 of the C-clamp 120 and extended horizontally toward the second vertically oriented side 128 of the C-clamp 120. In another embodiment, clip 144 comprises an internally threaded flange on one or both sides of the clip (not illustrated), in which case, the external threads of the second screw 146 pass through the internally threaded flange(s) of the slot. The flange(s) comprise a protruded ridge, lip or rim, for example, an externally protruded ridge, lip, or rim. Alternatively, either or both flanges could be internally protruded. In essence the flange(s) guide the movement of the second screw through the clip and accompanying slot. Movement of the handle 150 of the second screw 146 causes the second end of the second screw to further extend or move horizontally toward the second vertically oriented side 128 of the C-clamp 120 such that the shoes 138 and 152 of the respective first and second screws frictionally engage the support structure 140 when the support structure is positioned between the first and second vertically oriented sides of the C-clamp. In one embodiment, the support structure 140 may be a right-angle structure, as illustrated in FIGS. 2D and 2E, such as a piece of angle iron. While the second screw is smaller than the first screw in the illustrations, it is appreciated that the screws may be substantially the same size, or the first screw may be smaller than the second screw.

According to an embodiment, with reference to FIGS. 7 and 8, the platform assembly further comprises a threaded fixing, e.g., a bolt or screw 160 (hidden from view in these FIGS), positioned along a length of the horizontally oriented side 122 of the C-clamp 120, via which to couple at least a portion of the horizontally oriented side 122 of the C-clamp 120 to the bottom end 112 of the vertical support member 108. According to this embodiment, the horizontally oriented side 122 of the C-clamp comprises a corresponding hole 162 positioned along the length of the horizontally oriented side 122 of the C-clamp 120 through which the threaded fixing, e.g., bolt or screw 160, passes to couple at least the portion of the horizontally oriented side 122 of the C-clamp 120 to the bottom end 112 of the vertical support member 108.

According on one embodiment, the threaded fixing comprises a bolt or screw 160 with external male threads that passes through the hole, e.g., hole 162 positioned along the length of the horizontally oriented side 122 of the C-clamp 120 to mate with a nut 164 with internal female threads embedded at the bottom end of the vertical support member to couple at least the portion of the horizontally oriented side 122 of the C-clamp 120 to the bottom end of the vertical support member 108.

FIGS. 16A-16H and 17A-17C disclose an additional embodiment in which the C-clamp is oriented in a vertical direction instead of oriented in a horizontal direction as described in the above disclosed embodiments. According to this embodiment, the platform assembly comprises a platform 104 extending in a horizontal plane and having a bottom surface, a vertical support member 108 (column, post, pole, stand) having a lower end 112, and an upper end 110 coupled to the bottom surface 106 of the platform 104. A C-clamp 120 comprises a first horizontally oriented side

202 at least a portion of which is coupled to the lower end 106 of the vertical support member 108. In one embodiment, the platform assembly includes a horizontally oriented plate 142 wherein the portion of the first horizontally oriented side 202 of the C-clamp coupled to the lower end of the vertical support member, comprises the horizontally oriented plate 142 coupled to the lower end 106 of the vertical support member 108 and the portion of the first horizontally oriented side 202 of the C-clamp 120 coupled to the horizontally oriented plate 142. The C-clamp further includes a vertically oriented side 204 meeting the first horizontally oriented side 202 at a first corner of the C-clamp and extending downward, and a second horizontally oriented side 206 meeting the vertically oriented side 204 at a second corner of the C-clamp 120, the second horizontally oriented side comprising a second threaded hole 208. A screw 132 comprises a handle 136 at a first end of the screw and a shoe 138 at a second end of the screw. The second end of the screw passes through the second threaded hole 208 of the second horizontally oriented side 206 of the C-clamp 120 and extends vertically up toward the first horizontally oriented side 202 of the C-clamp 120, wherein movement of the handle causes the second end of the screw to further extend vertically up toward the first horizontally oriented side of the C-clamp such that the shoe and the first horizontally oriented side of the C-clamp frictionally engage a support structure when the support structure is positioned between the first and second horizontally oriented sides of the C-clamp. Other aspects and elements of this embodiment and the illustrated variations thereof are the same as the above described embodiments and thus a discussion of the same is not repeated here.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A platform assembly comprising:
   a platform extending in a horizontal plane and having a bottom surface;
   a vertical support member having a lower end, and an upper end directly coupled to the bottom surface of the platform;
   a C-clamp comprising:
   a horizontal side at least a portion of which is coupled to the lower end of the vertical support member;
   a first vertical side meeting the horizontal side at a first corner of the C-clamp and extending downward; and
   a second vertical side meeting the horizontal side at a second corner of the C-clamp and extending downward, the second vertical side comprising a threaded hole; and
   a screw comprising a handle at a first end of the screw and a shoe at a second end of the screw, the second end of the screw passing through the threaded hole of the second vertical side of the C-clamp and extending horizontally toward the first vertical side of the C-clamp, wherein movement of the handle causes the second end of the screw to further extend horizontally toward the first vertical side of the C-clamp such that the shoe and the first vertical side of the C-clamp frictionally engage a support structure when the support structure is positioned between the first and second vertical sides of the C-clamp.

2. The platform assembly of claim 1, further comprising a vertical plate abutting an inside surface of the first vertical side of the C-clamp; and wherein the movement of the handle that causes the second end of the screw to further extend horizontally toward the first vertical side of the C-clamp such that the shoe and the first vertical side of the C-clamp frictionally engage the support structure when the support structure is positioned between the first and second vertical sides of the C-clamp, comprises movement of the handle that causes the second end of the screw to further extend horizontally toward the first vertical side of the C-clamp and the vertical plate abutting the inside surface of the first vertical side of the C-clamp such that the shoe and the first vertical side of the C-clamp and the vertical plate abutting the inside surface of the first vertical side of the C-clamp frictionally engage the support structure when the support structure is positioned between the first vertical side of the C-clamp abutting the vertical plate and second vertical side of the C-clamp.

3. The platform assembly of claim 1, further comprising a horizontal plate;

wherein the portion of the horizontal side of the C-clamp coupled to the lower end of the vertical support member, comprises:

the horizontal plate coupled to the lower end of the vertical support member; and the portion of the horizontal side of the C-clamp coupled to the horizontal plate.

4. The platform assembly of claim 3, further comprising a second C-clamp having a horizontal side coupled to the horizontal plate.

5. The platform assembly of claim 3, wherein the portion of the horizontal side of the C-clamp coupled to the horizontal plate, comprises the portion of the horizontal side of the C-clamp slidably coupled to the horizontal plate.

6. The platform assembly of claim 3, wherein the horizontal plate comprises an elongated aperture; and wherein the platform assembly further comprises a threaded fixing positioned along a length of the horizontal side of the C-clamp and passing through any position along the elongated aperture of the horizontal plate via which the portion of the horizontal side of the C-clamp is coupled to the horizontal plate.

7. The platform assembly of claim 3, wherein the horizontal plate coupled to the lower end of the vertical support member, and the portion of the horizontal side of the C-clamp coupled to the horizontal plate, comprises the horizontal plate molded with the horizontal side of the C-clamp as a single component of the platform assembly.

8. The platform assembly of claim 1, further comprising a threaded fixing positioned along a length of the horizontal side of the C-clamp via which to couple the portion of the horizontal side of the C-clamp to the lower end of the vertical support member.

9. The platform assembly of claim 8, wherein the horizontal side of the C-clamp comprises a hole positioned along the length of the horizontal side of the C-clamp through which the threaded fixing passes to couple the portion of the horizontal side of the C-clamp to the lower end of the vertical support member.

10. The platform assembly of claim 9, wherein the threaded fixing comprises a bolt with external male threads that passes through the hole positioned along the length of the horizontal side of the C-clamp to mate with a nut with internal female threads embedded at the lower end of the vertical support member to couple the portion of the horizontal side of the C-clamp to the lower end of the vertical support member.

11. The platform assembly of claim 8, wherein the horizontal side of the C-clamp comprises a plurality of holes positioned along the length of the horizontal side of the C-clamp, wherein the threaded fixing passes through any one of the plurality of holes of the horizontal side of the C-clamp to couple the portion of the horizontal side of the C-clamp to the lower end of the vertical support member.

12. The platform assembly of claim 1, wherein the first vertical side of the C-clamp comprises a threaded hole, the platform assembly further comprising a second screw comprising a handle at a first end of the second screw and a shoe at a second end of the second screw, the second end of the second screw passing through the threaded hole of the first vertical side of the C-clamp and extending horizontally toward the second vertical side of the C-clamp, wherein movement of the handle of the second screw causes the second end of the second screw to further extend horizontally toward the second vertical side of the C-clamp such that the shoes of the respective first and second screws frictionally engage the support structure when the support structure is positioned between the first and second vertical sides of the C-clamp.

13. The platform assembly of claim 12, wherein the threaded hole in the first vertical side of the C-clamp comprises a slot and a clip slidably engaged with the slot, wherein the second screw passing through the threaded hole of the first vertical side of the C-clamp comprises the second screw passing through the slot.

14. The platform assembly of claim 13, wherein the second screw comprises an externally threaded second screw, and wherein the clip comprises an internally threaded flange, wherein the second screw passing through the threaded hole of the first vertical side of the C-clamp comprises the externally threaded second screw passing through the internally threaded flange of the slot.

15. The platform assembly of claim 1, wherein the horizontal side of the C-clamp, at least the portion of which is coupled to the lower end of the vertical support member, comprises the horizontal side molded or 3D-printed with the lower end of the vertical support member as a single component of the platform assembly.

16. The platform assembly of claim 1 wherein the vertical support member comprises a vertical cylinder having a diameter, as measured along a horizontal axis, and a length, as measured along a vertical axis, that is greater than the diameter of the cylinder.

17. The platform assembly of claim 16, wherein the length of the cylinder greater than the diameter of the cylinder, comprises the length of the cylinder greater than three times the diameter of the cylinder.

18. The platform assembly of claim 16, wherein the cylinder is a right circle cylinder.

19. A platform assembly comprising:

a platform extending in a horizontal plane and having a bottom surface;

a vertical post having a width, as measured along a horizontal axis, and a length, as measured along a vertical axis, that is greater than the width, the vertical post having a lower end, and an upper end directly coupled to the bottom surface of the platform;

a C-clamp comprising:

a horizontal side at least a portion of which is coupled to the lower end of the vertical post;

a first vertical side meeting the horizontal side at a first corner of the C-clamp and extending downward; and a second vertical side meeting the horizontal side at a second corner of the C-clamp and extending downward, the second vertical side comprising a threaded hole; and a screw comprising a handle at a first end of the screw and a shoe at a second end of the screw, the second end of the screw passing through the threaded hole of the second vertical side of the C-clamp and extending horizontally toward the first vertical side of the C-clamp, wherein movement of the handle causes the second end of the screw to further extend horizontally toward the first vertical side of the C-clamp such that the shoe and the first vertical side of the C-clamp frictionally engage a support structure when the support structure is positioned between the first and second vertical sides of the C-clamp.

* * * * *